United States Patent
Tominaga et al.

(10) Patent No.: US 12,060,302 B2
(45) Date of Patent: Aug. 13, 2024

(54) CRYSTALLINE SILICON CARBIDE FIBER AND METHOD FOR MANUFACTURING SAME, AND CERAMIC COMPOSITE SUBSTRATE

(71) Applicant: UBE CORPORATION, Ube (JP)

(72) Inventors: Yuusuke Tominaga, Ube (JP); Hiroyuki Yamaoka, Ube (JP); Kouichirou Suyama, Ube (JP); Hideki Ozawa, Ube (JP); Mao Sumino, Ube (JP)

(73) Assignee: UBE CORPORATION, Yamaguchi (JP)

( * ) Notice: Subject to any disclaimer, the term of this patent is extended or adjusted under 35 U.S.C. 154(b) by 736 days.

(21) Appl. No.: 17/264,338

(22) PCT Filed: Aug. 6, 2019

(86) PCT No.: PCT/JP2019/030994
§ 371 (c)(1),
(2) Date: Jan. 29, 2021

(87) PCT Pub. No.: WO2020/032067
PCT Pub. Date: Mar. 13, 2020

(65) Prior Publication Data
US 2021/0300829 A1    Sep. 30, 2021

(30) Foreign Application Priority Data

Aug. 6, 2018 (JP) .................................. 2018-147709

(51) Int. Cl.
*C04B 35/622* (2006.01)
*C04B 35/64* (2006.01)
(Continued)

(52) U.S. Cl.
CPC ........ *C04B 35/62281* (2013.01); *C04B 35/64* (2013.01); *C04B 35/80* (2013.01);
(Continued)

(58) Field of Classification Search
CPC ... C04B 35/62281; C04B 35/64; C04B 35/80; C04B 2235/5244; C04B 2235/656;
(Continued)

(56) References Cited

U.S. PATENT DOCUMENTS

| 6,203,904 B1 | 3/2001 | Sacks |
| 2005/0031866 A1 | 2/2005 | Yamaoka et al. |

FOREIGN PATENT DOCUMENTS

| CN | 102634868 A | 8/2012 |
| JP | H09-031756 A | 2/1997 |

(Continued)

OTHER PUBLICATIONS

JPH0931756A machine translation (Year: 1997).*
(Continued)

*Primary Examiner* — Bryan D. Ripa
*Assistant Examiner* — Cameron K Miller
(74) *Attorney, Agent, or Firm* — Oliff PLC

(57) ABSTRACT

A crystalline silicon carbide fiber containing silicon carbide and boron nitride, the crystalline silicon carbide fiber having a content of Si of 64% to 72% by weight, a content of C of 28% to 35% by weight, and a content of B of 0.1% to 3.0% by weight, and including, at a surface portion, a composition gradient layer in which a content of silicon carbide increases while a content of boron nitride decreases toward a depth direction.

22 Claims, 12 Drawing Sheets

(51) Int. Cl.
  *C04B 35/80* (2006.01)
  *D01D 5/08* (2006.01)
  *D01F 9/10* (2006.01)
(52) U.S. Cl.
  CPC .................. *D01D 5/08* (2013.01); *D01F 9/10* (2013.01); *C04B 2235/5244* (2013.01); *C04B 2235/656* (2013.01); *C04B 2235/658* (2013.01); *C04B 2235/661* (2013.01); *C04B 2235/75* (2013.01)
(58) Field of Classification Search
  CPC ........ C04B 2235/658; C04B 2235/661; C04B 2235/75; D01D 5/08; D01F 9/10
  See application file for complete search history.

(56) References Cited

FOREIGN PATENT DOCUMENTS

| JP | H0931756 | A | * | 2/1997 | | |
| JP | 3279134 | B2 | | 4/2002 | | |
| JP | 2003-113537 | A | | 4/2003 | | |
| JP | 3417459 | B2 | | 6/2003 | | |
| JP | H1136142 | A | * | 6/2003 | ........... | C04B 35/571 |
| JP | 2003-183979 | A | | 7/2003 | | |

OTHER PUBLICATIONS

JPH1136142A machine translation (Year: 2003).*
Apr. 5, 2022 Extended European Search Report issued in European Application No. 19848726.6.
Sep. 10, 2019 Search Report issued in International Search Report issued in International Patent Application No. PCT/JP2019/030994.
Kumagawa et al.; "Thermal Stability and Chemical Corrosion Resistance of Newly Developed Continuous Si—Zr—C—O Tyranno Fiber;" Ceramic Engineering & Science Proceedings; 1997; pp. 113-118; vol. 18.
Feb. 9, 2021 International Preliminary Report on Patentability issued in International Patent Application No. PCT/JP2019/030994.

* cited by examiner

CRYSTALLINE SILICON CARBIDE FIBER AND METHOD FOR MANUFACTURING SAME, AND CERAMIC COMPOSITE SUBSTRATE

TECHNICAL FIELD

The present disclosure relates to a crystalline silicon carbide fiber and a method for manufacturing the same, and a ceramic composite substrate.

BACKGROUND ART

Silicon carbide fibers have excellent heat resistance and mechanical characteristics, and therefore, those fibers have been utilized as reinforcing fibers for various materials. Silicon carbide fibers are known to include amorphous fibers and crystalline fibers, and crystalline fibers are particularly excellent in terms of mechanical characteristics. For example, in Patent Literature 1, a crystalline silicon carbide fiber whose strength and elastic modulus are 2 GPa or more and 250 GPa or more, respectively, is obtained by using both aluminum and boron in combination.

Silicon carbide fibers are useful as reinforcing fibers for composite materials having ceramics as matrices. In Patent Literature 2, a crystalline silicon carbide fiber having a BN layer on the fiber surface and containing TiC has been suggested in order to obtain a ceramic composite material having high fracture energy.

However, as described in Non Patent Literature 1, when Ti is included in a silicon carbide fiber, the alkali resistance at high temperatures is impaired. Therefore, a silicon carbide fiber including Ti is not preferable as a reinforcing fiber for a ceramic composite material.

CITATION LIST

Patent Literature

Patent Literature 1: Japanese Patent No. 3417459
Patent Literature 2: Japanese Patent No. 3279134

Non Patent Literature

Non Patent Literature 1: Ceramic Engineering & Science Proceedings, vol. 18, p. 113-118 (1997)

SUMMARY OF INVENTION

Technical Problem

Crystalline carbon fibers having excellent heat resistance have been used in various use applications where durability under high temperature conditions is required, such as engines for automobiles and aircrafts. Under such circumstances, if a technology capable of further enhancing creep characteristics at high temperatures can be established, further enhancement of durability can be expected. However, since the creep characteristics are usually in a trade-off relationship with strength, there are concerns that when the creep characteristics are increased, strength may be decreased. Thus, the present disclosure provides a crystalline silicon carbide fiber having excellent tensile creep characteristics at high temperatures while having high tensile strength, and a method for manufacturing the same. Furthermore, the present disclosure provides a ceramic composite substrate including the above-described crystalline silicon carbide fiber, the ceramic composite substrate having excellent tensile creep characteristics at high temperatures while having high tensile strength.

Solution to Problem

According to an aspect of the present disclosure, there is provided a crystalline silicon carbide fiber comprising silicon carbide and boron nitride, the crystalline silicon carbide fiber having a content of Si of 64% to 72% by weight, a content of C of 28% to 35% by weight, and a content of B of 0.1% to 3.0% by weight, the crystalline silicon carbide fiber including, at a surface portion, a composition gradient layer in which a content of silicon carbide increases while a content of boron nitride decreases toward a depth direction.

This crystalline silicon carbide fiber includes, at a surface portion, a composition gradient layer in which the content of silicon carbide increases while the content of boron nitride decreases toward the depth direction. By including such a composition gradient layer, the continuity of the composition between the inner portion and the surface portion is improved as compared to a case in which only a boron nitride layer is provided on the surface of a silicon carbide fiber. Therefore, deformation at high temperatures is sufficiently suppressed, and the tensile creep characteristics at high temperatures can be enhanced while retaining high tensile strength.

The crystalline silicon carbide fiber includes a main body portion containing silicon carbide as a main component on the side closer to the center than the composition gradient layer, and the composition gradient layer may include a B-rich portion having a higher atomic ratio of B than that of Si on the surface side and a Si-rich portion having a higher atomic ratio of Si than that of B on the side closer to the center than the B-rich portion. Thereby, the crystalline silicon carbide fiber can have enhanced integrity of the composition gradient layer and the main body portion while containing a portion with a high atomic ratio of B. Therefore, the tensile creep characteristics at high temperatures and the tensile strength after being exposed to a high temperature environment can be achieved in a well-balanced manner at a higher level.

The thickness of the B-rich portion may be 30 nm or more. By adjusting the thickness of the B-rich portion to be large as such, the tensile creep characteristics at high temperatures can be further enhanced.

The atomic ratio of B in the B-rich portion may be 5 atom % or more. Thereby, the high-temperature strength of the crystalline silicon carbide fiber can be further increased.

The thickness of the composition gradient layer may be 30 nm or more. As such, by increasing the thickness of the composition gradient layer, the tensile creep characteristics at high temperatures can be enhanced while retaining sufficiently high tensile strength.

The crystalline silicon carbide fiber may include at least one element selected from the group consisting of Al, Y, Zr, and Mg. In a case in which the fiber includes Al, the content thereof may be 3.8% by weight or less. In a case in which the fiber includes Y, the content thereof may be 3.8% by weight or less. In a case in which the fiber includes Zr, the content thereof may be 3.8% by weight or less. In a case in which the fiber includes Mg, the content thereof may be 3.8% by weight or less. As the crystalline silicon carbide fiber includes at least one element selected from the group consisting of Al, Y, Zr, and Mg at a proportion in a predetermined range, high tensile strength and excellent tensile creep characteristics at high temperatures can be achieved in a well-balanced manner.

According to another aspect of the present disclosure, there is provided a method for manufacturing a crystalline silicon carbide fiber having a content of Si of 64% to 72% by weight, a content of C of 28% to 35% by weight, and a content of B of 0.1% to 3.0% by weight, the method having a calcination step of heating an amorphous silicon carbide fiber containing boron to 1550° C. to 2200° C. in an inert atmosphere including nitrogen, and thereby forming, at a surface portion, a composition gradient layer in which the content of silicon carbide increases while the content of boron nitride decreases toward the depth direction.

In this manufacturing method, the composition gradient layer in which the content of silicon carbide increases while the content of boron nitride decreases toward the depth direction, is formed at the surface portion. By forming such a composition gradient layer, the continuity of the composition between the inner portion and the surface portion is improved as compared to a case in which only a boron nitride layer is provided on the surface of a silicon carbide fiber. Therefore, deformation at high temperatures is sufficiently suppressed, and the tensile creep characteristics at high temperatures can be enhanced while retaining high tensile strength.

Before the calcination step, the method may have a pretreatment step of heating at 1550° ° C. to 1850° C. in an inert atmosphere different from nitrogen and obtaining a heating treatment product, and in the calcination step, the heating treatment product may be heated at a temperature higher than that of the pretreatment step in an inert atmosphere including nitrogen. As such, by having a pretreatment step with a low heating temperature, rapid crystallization of SiC can be suppressed, and silicon carbide can be brought into a microcrystalline state before the calcination step. By acquiring such a microcrystalline state, the solid solution amount of boron can be maintained. Then, the uniformity of diffusion of B in the subsequent calcination step is enhanced, and the composition gradient layer including boron nitride can be stably formed.

In the calcination step, the heating treatment product may be heated to 1900° C. to 2200° C. Thereby, the composition gradient layer can be sufficiently formed while crystallization of silicon carbide is caused to sufficiently progress.

The above-described manufacturing method may also include a spinning step of melt-spinning a thermoplastic polymer composition including an organosilicon polymer and an organoboron compound to obtain a fiber; an infusibilization step of heating the fiber in an atmosphere including oxygen; and a heating step of heating the infusibilized fiber in an inert gas at a temperature in the range of 800° C. to 1500° C. and thereby obtaining an amorphous silicon carbide fiber.

An organoboron compound tends to be easily incorporated into the molecular structure of a thermoplastic polymer by a condensation reaction with an organosilicon polymer. Therefore, the boron component scattering in the spinning step, the infusibilization step, and the heating step can be suppressed. Thereby, the composition gradient layer can be smoothly formed in the calcination step. Therefore, a crystalline silicon carbide fiber having excellent tensile creep characteristics at high temperatures while having high tensile strength can be efficiently produced.

According to still another aspect of the present disclosure, there is provided a ceramic composite substrate including a ceramic material and the above-mentioned crystalline silicon carbide fiber. Since such a ceramic composite substrate includes the above-mentioned crystalline silicon carbide fiber, deformation at high temperatures is sufficiently suppressed, and the tensile creep characteristics at high temperatures can be enhanced while retaining high tensile strength.

Advantageous Effects of Invention

According to the present disclosure, a crystalline silicon carbide fiber having excellent tensile creep characteristics at high temperatures while having high tensile strength, and a method for manufacturing the same can be provided. Furthermore, a ceramic composite substrate including a crystalline silicon carbide fiber having excellent tensile creep characteristics at high temperatures while having high tensile strength can be provided.

DESCRIPTION OF EMBODIMENTS

Figure 1:
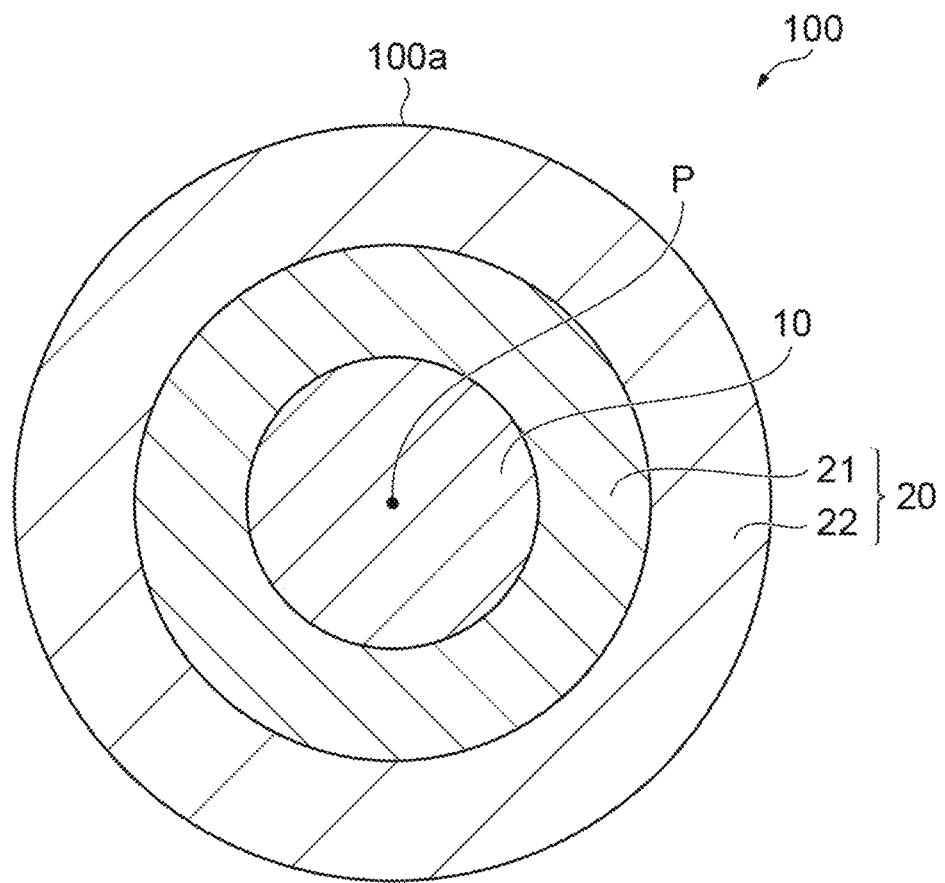
FIG. 1 is a cross-sectional view schematically illustrating a cross-section in the diameter direction of a crystalline silicon carbide fiber according to an embodiment.

Hereinafter, an embodiment of the present disclosure will be described, with reference to the drawings depending on cases. However, the following embodiments are examples for describing the present disclosure and are not intended to limit the present disclosure to the following contents. In the description, identical elements or elements having an identical function will be assigned with identical reference numerals, and depending on cases, any overlapping description will not be repeated herein. Furthermore, unless particularly stated otherwise, the positional relationship such as up and down or right and left will be considered to be based on the positional relationship illustrated in the drawings. Furthermore, the dimensional ratios of various elements are not limited to the ratios shown in the diagrams.

FIG. 1 is a cross-sectional view schematically illustrating a cross-section in the diameter direction of a crystalline silicon carbide fiber of an embodiment. The crystalline silicon carbide fiber 100 includes a main body portion 10 containing crystalline silicon carbide as a main component in the inner portion including the center P; and a composition gradient layer 20 containing silicon carbide and boron nitride at the surface portion. According to the present disclosure, the surface portion refers to a portion including the surface 100a, and the inner portion refers to a portion that includes the center P and is covered by the surface portion. Incidentally, in FIG. 1, the boundary between the main body portion 10 and the composition gradient layer 20 is clearly indicated; however, it is not necessary that a physical boundary exists between the two. That is, it is desirable that the boundary between a portion in which the composition slopes along the depth direction and a portion in which the composition does not slope along the depth direction is clearly indicated. The "depth direction" according to the present disclosure refers to a direction facing from the surface 100a toward the center P in a cross-section as illustrated in FIG. 1.

The content of silicon carbide in the main body portion 10 may be higher than that in the surface portion. The main body portion 10 is formed of crystalline silicon carbide and may be formed of silicon carbide only or may include boron nitride. Furthermore, the main body portion may include carbon as a simple substance or may include a compound including at least one selected from the group consisting of carbon, aluminum, yttrium, zirconium, magnesium, and oxygen. From the viewpoint of further increasing the tensile strength and the tensile creep characteristics at high temperatures, the content of crystalline silicon carbide in the main body portion 10 may be, for example, 95% by weight or more, may be 97% by weight or more, and may be 99% by weight or more. The content of boron nitride in the main body portion 10 may be, for example, 1% by weight or less, and the main body portion may not contain boron nitride. Since the crystalline silicon carbide fiber includes the main body portion 10 containing crystalline silicon carbide as a main component as such, the crystalline silicon carbide fiber has excellent heat resistance and also has high tensile strength.

In the composition gradient layer 20, the content of silicon carbide increases while the content of boron nitride decreases toward the depth direction. That is, in the composition gradient layer 20, the content of boron nitride is larger while the content of silicon carbide is lower, on the surface 100a side than on the main body portion 10 side. By having such a gradient, the content of boron nitride in the vicinity of the surface 100a (surface portion) can be made larger while the content of silicon carbide in the main body portion 10 is made larger. By including such a composition gradient layer 20, the continuity of the composition between the inner portion and the surface portion of the crystalline silicon carbide fiber is improved, and the generation of creep at high temperatures is suppressed. Therefore, deformation at high temperatures is sufficiently suppressed, and the tensile creep characteristics can be enhanced.

The composition gradient layer 20 may also include components other than silicon carbide and boron nitride. The composition gradient layer may include carbon as a simple substance or may include a compound including at least one selected from the group consisting of carbon, aluminum, yttrium, zirconium, magnesium, and oxygen. The thickness of the composition gradient layer 20 may be, for example, 30 nm or more, may be 30 to 1500 nm, may be 50 to 1000 nm, and may be 100 to 500 nm.

The thickness of the composition gradient layer 20 is measured by the following procedure. The boron concentration is measured at a predetermined interval along the depth direction using a commercially available scanning Auger electron spectrometer. The measurement interval at this time is set as indicated in Table 1. Incidentally, in a region in which the depth from the surface is 1000 nm or more, the measurement interval is set to 50 nm. The measurement values measured from the surface toward the depth direction are respectively designated as $d_0$, $d_1$, $d_2$, $d_3$, $d_4$, ..., $d_{n-4}$, $d_{n-3}$, $d_{n-2}$, $d_{n-1}$, and $d_m$, .... $d_0$ is the boron concentration at the surface. At this time, the four-point moving average value AVE is calculated by the following calculation formula (n is a natural number greater than or equal to 4).

$$AVE_3 = (d_0 + d_1 + d_2 + d_3)/4$$

$$AVE_4 = (d_1 + d_2 + d_3 + d_4)/4$$

...

$$AVE_{n-1} = (d_{n-4} + d_{n-3} + d_{n-2} + d_{n-1})/4$$

$$AVE_n = (d_{n-3} + d_{n-2} + d_{n-1} + d_n)/4$$

$$AVE_{n+1} = (d_{n-2} + d_{n-1} + d_n + d_{n+1})/4$$

The amounts of change $\Delta$ of the four-point moving average value are respectively calculated by the following calculation formulae.

$$\Delta_3 = AVE_4 - AVE_3$$

$$\Delta_4 = AVE_5 - AVE_4$$

...

$$\Delta_{n-1} = AVE_n - AVE_{n-1}$$

$$\Delta_n = AVE_{n+1} - AVE_n$$

When the amounts of change $\Delta$ from the surface side toward the depth direction are respectively calculated, the amount of change $\Delta$ (for example, $\Delta_k$) just one before the amount of change $\Delta$ (for example, $\Delta_{k+1}$) at which the amount of change $\Delta$ has a positive value for the first time after having a negative value consecutively for four or more points, is defined as the thickness of the composition gradient layer 20 (k is a natural number greater than or equal to 4).

The composition gradient layer 20 may include a Si-rich portion 21 and a B-rich portion 22 in this order from the main body portion 10 side. The Si-rich portion 21 has a higher atomic ratio of Si than that of B, and the B-rich portion 22 has a higher atomic ratio of B than that of Si. The content of Si in the Si-rich portion 21 is, for example, 10 atom % to 60 atom %. The content of B in the B-rich portion 22 may be, for example, 5 atom % or more and may be 5 atom % to 50 atom %. Incidentally, in FIG. 1, the boundary between the Si-rich portion 21 and the B-rich portion 22 is clearly indicated; however, it is not necessary that a physical boundary exists between the two. The composition gradient layer 20 may not have the B-rich portion 22.

As the composition gradient layer 20 has the B-rich portion 22, the tensile creep characteristics at high temperatures can be further enhanced. The thickness of the B-rich portion 22 may be 10 nm or more, may be 30 nm or more, may be 40 nm or more, may be 40 to 200 nm, and may be 40 to 100 nm. It is preferable that the thickness of the composition gradient layer 20 is larger than the thickness of the B-rich portion 22. The ratio of thicknesses of the composition gradient layer 20 to the B-rich portion 22 may be 2 or larger or may be 3 or larger. When the composition gradient layer 20 has the Si-rich portion 21, even after being exposed to a high-temperature environment, the composition gradient layer can maintain sufficiently high tensile strength. The thickness of the Si-rich portion 21 may be 10 nm or more, may be 30 to 500 nm, and may be 50 to 300 nm.

The crystalline silicon carbide fiber 100 contains silicon carbide and boron nitride. The content of Si in the crystalline silicon carbide fiber 100 is 64% to 72% by weight and may be 64% to 70% by weight. The content of C in the crystalline silicon carbide fiber 100 is 28% to 35% by weight and may be 30% to 35% by weight. The content of B in the crystalline silicon carbide fiber 100 is 0.1% to 3.0% by weight, may be 0.1% to 2.0% by weight, may be 0.1% to 1.0% by weight, may be 0.15% to 1.0% by weight, or may be 0.15% to 0.4% by weight. The content of N in the crystalline silicon carbide fiber 100 may be 0.1% to 4.0% by weight, may be 0.1% to 2.0% by weight, may be 0.2% to 1.3% by weight, or may be 0.2% to 0.8% by weight. In addition to these elements, the crystalline silicon carbide fiber 100 may also include at least one element selected from the group consisting of oxygen (O), Al, Y, Zr, and Mg. The respective elements may be included as simple substances or may be included as compounds.

The content of oxygen (O) in the crystalline silicon carbide fiber 100 may be 2% by weight or less or may be 1% by weight or less. The content of Al may be 3.8% by weight or less or may be 2% by weight or less. The content of Y may be 3.8% by weight or less or may be 2% by weight or less. The content of Zr may be 3.8% by weight or less or may be 2% by weight or less. The content of Mg may be 3.8% by weight or less or may be 2% by weight or less.

The content of Ti in the crystalline silicon carbide fiber 100 may be less than 2.0% by weight, may be less than 0.2% by weight, or may be less than 0.1% by weight. As such, by reducing the content of Ti, the alkali resistance can be enhanced.

In a case in which the cross-section in the diameter direction of the crystalline silicon carbide fiber 100 has a perfect circular shape, the outer diameter may be, for example, 1 to 50 μm or may be 5 to 40 μm. The cross-section in the diameter direction of the crystalline silicon carbide fiber 100 is not limited to a perfect circular shape and may be, for example, an elliptical shape. The density of the crystalline silicon carbide fiber 100 may be, for example, 2.7 to 3.2 g/cm$^3$.

The crystalline silicon carbide fiber 100 has excellent tensile creep characteristics at high temperatures. Furthermore, the crystalline silicon carbide fiber 100 is also excellent in terms of the tensile strength before exposure to a high-temperature atmosphere as well as the tensile strength after exposure. When the tensile strength after exposure for one hour at 1500° C. in an argon gas atmosphere is designated as S1, S1 may be, for example, 2.5 GPa or more or may be 3.0 GPa or more. When the tensile strength before exposure is designated as S0, the strength retention ratio [(S1/S0)] may be 0.9 or more or may be 0.93 or more.

The ceramic composite substrate according to an embodiment contains a ceramic material and the crystalline silicon carbide fiber 100. Specifically, the ceramic composite substrate contains a ceramic material that serves as a matrix, and the crystalline silicon carbide fiber 100 that reinforces the ceramic material (matrix). With regard to the ceramic composite substrate, the crystalline silicon carbide fiber 100 may be dispersed in the ceramic material. With regard to the ceramic composite substrate, the crystalline silicon carbide fiber 100 may be included as a two-dimensional woven fabric such as a plain weave or satin weave, or a three-dimensional woven fabric. Furthermore, the crystalline silicon carbide fiber 100 may be included as a sheet-like nonwoven fabric or may be included as a laminate of those nonwoven fabrics.

Examples of the ceramic material as the matrix include crystalline and amorphous oxide ceramic materials, crystalline and amorphous non-oxide ceramic materials, glass, and crystallized glass. Regarding the ceramic material, one kind or two or more kinds among these may be included.

Specific examples of the oxide ceramic materials include oxides containing at least one selected from the group consisting of aluminum, magnesium, silicon, yttrium, indium, uranium, calcium, scandium, tantalum, niobium, neodymium, lanthanum, ruthenium, rhodium, beryllium, titanium, tin, strontium, barium, zinc, zirconium, and iron, as constituent elements.

Examples of the non-oxide ceramic materials include carbides, nitrides, and borides. Examples of the carbides include carbides containing at least one selected from the group consisting of silicon, titanium, zirconium, aluminum, uranium, tungsten, tantalum, hafnium, boron, iron, and manganese, as constituent elements. Specific examples of the carbides (composite carbides) include inorganic materials obtainable by heating and calcining polytitanocarbosilane and polyzirconocarbosilane.

Examples of the nitrides include nitrides containing at least one selected from the group consisting of silicon, boron, aluminum, magnesium, and molybdenum as constituent elements. The nitrides may be composite oxides containing these elements as constituent elements. A specific example of the composite oxides includes sialon.

Examples of the borides include borides of titanium, yttrium, and lanthanum. Specific examples include platinum group lanthanoid borides such as $CeCoB_2$, $CeCo_4B_4$, and $ErRh_4B_4$.

Examples of the glass include amorphous glasses such as silicate glasses, phosphate glasses, and borate glasses. Examples of the crystallized glass include $LiO_2$—$Al_2O_3$—$MgO$—$SiO_2$-based glass and $LiO_2$—$Al_2O_3$—$MgO$—$SiO_2$—$Nb_2O_5$-based glass, whose main crystal phase is β-spodumene. Furthermore, examples include $MgO$—$Al_2O_3$—$SiO_2$-based glass whose main crystal phase is cordierite, $BaO$—$MgO$—$Al_2O_3$—$SiO_2$-based glass whose main crystal phase is barium osumilite, $BaO$—$Al_2O_3$—$SiO_2$-based glass whose main crystal phase is mullite or hexacelsian, and $CaO$—$Al_2O_3$—$SiO_2$-based glass whose main crystal phase is anorthite. In the crystal phases of these crystallized glasses, cristobalite may be included. The ceramic material as the matrix may be a solid solution of various above-described ceramics.

Since such a ceramic composite substrate includes the above-mentioned crystalline silicon carbide fiber, deformation at high temperatures is sufficiently suppressed, and tensile creep characteristics at high temperatures can be enhanced while retaining high tensile strength. The content proportions of the ceramic material and the crystalline silicon carbide fiber may be such that when the sum of the ceramic material and the crystalline silicon carbide fiber is designated as 100 parts by mass, the ceramic composite substrate may include 10 to 90 parts by mass of the crystalline silicon carbide fiber.

[Method for Manufacturing Crystalline Silicon Carbide Fiber]

An example of the method for manufacturing the crystalline silicon carbide fiber 100 will be described below. The present example has a spinning step of melt-spinning a thermoplastic polymer composition including an organosilicon polymer and an organoboron compound to obtain a fiber; an infusibilization step of heating the fiber in an atmosphere including oxygen and crosslinking the polymer molecules; a heating step of heating the infusibilized fiber in an inert gas at a temperature in the range of 800° C. to 1500° C. and thereby obtaining an amorphous silicon carbide fiber containing boron; and a calcination step of heating the amorphous silicon carbide fiber in an inert atmosphere including nitrogen to 1550° ° C. to 2200° C. and thereby forming, at a surface portion, a composition gradient layer in which a content of silicon carbide increases while a content of boron nitride decreases toward the depth direction.

The organosilicon polymer used in the spinning step can be prepared by, for example, the following procedure. First, one or more kinds of dichlorosilanes are subjected to a dechlorination reaction using sodium, and thereby a chain-like or cyclic polysilane is prepared. The number average molecular weight of the polysilane is, for example, 300 to 1000. The chain-like or cyclic polysilane may be a polysilane having a carbosilane bond, which is obtainable by heating or by a reaction. Such a polysilane may be obtained by heating a chain-like or cyclic polysilane to a temperature in the range of 400° C. to 700° C. or may be obtained by adding a phenyl group-containing polyborosiloxane to the chain-like or cyclic polysilane and heating the mixture to a temperature in the range of 250° ° C. to 500° C. The polysilane may have a hydrogen atom, a lower alkyl group, an aryl group, a phenyl group, or a silyl group in a side chain.

The phenyl group-containing polyborosiloxane can be prepared by a dechlorination condensation reaction between boric acid and one or more kinds of diorganochlorosilane. The number average molecular weight thereof is, for example, 500 to 10,000.

The organoboron compound may be a boric acid ester from the viewpoint of accelerating the condensation reaction with the organosilicon compound. The boric acid ester may include a boric acid ester formed from boric acid and a higher alcohol having 6 or more carbon atoms. Examples of the boric acid ester include triphenyl borate, trihexyl borate, tricyclohexyl borate, trioctyl borate, triisooctyl borate, trinonyl borate, tridecyl borate, tridodecyl borate, and trioctadecyl borate.

In the thermoplastic polymer composition, as an optional component other than the organosilicon polymer and the organoboron compound, an alkoxide, an acetylacetoxide compound, a carbonyl compound, a cyclopentadienyl compound, or the like of at least one metal selected from the group consisting of aluminum, yttrium, zirconium, and magnesium may also be used. A thermoplastic polymer composition is prepared by blending the organic silicon polymer, the organoboron compound, and if necessary, the optional component. Such a thermoplastic polymer composition is heated to, for example, 150° C. to 300° ° C. to melt and is spun.

In the infusibilization step, the spun fiber obtained in the spinning step is heated for 1 to 10 hours at a temperature of 250° C. to 350° C. in an atmosphere including oxygen (for example, air) to crosslink the polymer molecules. Thereby, the polymer is infusibilized.

In the heating step, the infusibilized fiber is subjected to a heating treatment for 10 seconds to 10 hours at a temperature of 800° C. to 1500° C., for example, in an inert atmosphere such as nitrogen gas or argon gas. Thereby, an amorphous silicon carbide fiber containing boron is obtained. In the amorphous silicon carbide fiber, boron may be included in the form of a compound.

In the calcination step, the amorphous silicon carbide fiber is heated to 1550° C. to 2200° ° C. in an inert atmosphere including nitrogen. The heating temperature may be 1550° C. to 2100° C. In the calcination step, crystallization of the silicon carbide fiber proceeds, and at the same time, a composition gradient layer in which the content of silicon carbide increases while the content of boron nitride decreases toward the depth direction is formed at the surface portion.

Calcination of the amorphous silicon carbide fiber containing boron may be carried out in a plurality of steps having different calcination conditions such as the atmosphere or the temperature. The plurality of steps may be carried out in a batch mode or may be carried out continuously. For example, a pretreatment step of obtaining a heating treatment product by heating in an inert atmosphere different from nitrogen; and a calcination step of heating the heating treatment product in an inert atmosphere including nitrogen at a temperature higher than that of the pretreatment step, may be carried out. The heating temperature for the pretreatment step may be, for example, 1550° ° C. to 1850° C., and may be 1550° C. to 1700° C. Thereby, the amorphous silicon carbide fiber can be brought into a microcrystalline state. Thereby, the solid solution amount of boron in the amorphous silicon carbide fiber is maintained. The heating treatment time for the pretreatment step is, for example, 10 seconds to 10 hours.

The heating temperature of the calcination step may be 1900° ° C. to 2200° ° C. As such, when the heating treatment product is calcined at a temperature higher than that of the pretreatment step, while crystallization of silicon carbide is caused to sufficiently progress, boron diffuses toward the surface, and thereby the composition gradient layer including boron nitride and silicon carbide is formed. In order to suppress excessive localization of boron nitride on the surface side, the heating time for the calcination step may be made shorter than the heating time for the pretreatment step. The heating time for the calcination step is, for example, 10 seconds to 10 hours.

The method for manufacturing the crystalline silicon carbide fiber 100 is not limited to the above-mentioned method, and the fiber may also be produced by other methods.

The ceramic composite substrate can be produced by, for example, the following procedure. The crystalline silicon carbide fiber 100 obtained by the above-mentioned manufacturing method is woven to produce a preform (woven fabric). This preform is impregnated with a slurry including a raw material powder of a ceramic material that serves as a matrix. The molding raw material obtained in this way is sintered by pressurizing the molding raw material at a high temperature by a hot press or the like. Thereby, a ceramic composite substrate can be obtained.

The method for manufacturing the ceramic composite substrate is not limited to the above-mentioned method, and the ceramic composite substrate may be produced by, for example, a polymer impregnation and calcination method. In this case, a solution is prepared by dissolving polycarbosilane, polymetallocarbosilane, polysilazane, or the like in a solvent such as xylene. The preform is impregnated with this solution and then dried, and thus a precursor is obtained. This precursor is subjected to compositization by heating and calcining the precursor, and a ceramic composite substrate can be obtained.

As a manufacturing method in addition to the above-mentioned method, a sol-gel method of using alkoxides of the constituent elements of the ceramic material that serves as a matrix, as raw materials; a chemical vapor phase deposition method of producing a ceramic material that serves as a matrix by a reaction of reactive gases at a high temperature; a reaction sintering method of impregnating molten metals at a high temperature and ceramicizing the metals by a reaction; and the like can be utilized. Furthermore, it is also acceptable that a portion of a ceramic material that serves as a matrix is formed by a chemical vapor phase deposition method, and then the remaining space is densified by using a reaction sintering method or a polymer impregnation and calcining method.

As described above, an embodiment has been described; however, the present disclosure is not limited to the above-described embodiment.

EXAMPLES

The matters of the present disclosure will be described in more detail with reference to Examples and Comparative Examples; however, the present disclosure is not intended to be limited to the following Examples.

Example 1

<Preparation of Crystalline Silicon Carbide Fiber>

A xylene solution was prepared by blending 1000 parts by weight of anhydrous xylene with 400 parts by weight of sodium. While this xylene solution was heated to reflux under a nitrogen gas stream, 1034 parts by weight of dimethyldichlorosilane was added dropwise into the xylene solution. After the dropwise addition, heating and refluxing was continued for 10 hours, and thereby a precipitate was generated. After this precipitate was filtered, the precipitate was sequentially washed with methanol and water. In this way, 420 parts by weight of white polydimethylsilane was obtained.

A mixed liquid was obtained by blending 750 parts of diphenyldichlorosilane and 124 parts of boric acid to 1000 parts by weight of n-butyl ether. This mixed liquid was heated to 100° C. to 120° C. in a nitrogen gas atmosphere, and a white resinous material was produced. This was filtered and then was heated for one hour at 400° C. in a vacuum. In this way, 530 parts by weight of phenyl group-containing polyborosiloxane was obtained.

4 parts by weight of phenyl group-containing polyborosiloxane was blended with 100 parts by weight of polydimethylsilane, and the mixture was thermally condensed by heating for 5 hours at 350° C. in a nitrogen gas atmosphere. Thereby, an organosilicon polymer having a high molecular weight was obtained. 100 parts by weight of this organosilicon polymer was dissolved in xylene to obtain a xylene solution. 12 parts by weight of an organoboron compound and 12 parts by weight of an organoaluminum compound were added to this xylene solution, and the mixture was heated for 9 hours at 280° C. under a nitrogen gas stream. As the organoboron compound, Tris IsoDecyl Borate (TIDB) was used, and as the organoaluminum compound, aluminum tri(sec-butoxide) was used. In this way, a thermoplastic polymer composition was obtained.

The thermoplastic polymer composition was melt-spun at 245° C. and then was heat-treated for 5 hours at 250° C. in air, and thereby an infusibilized fiber was obtained. The infusibilized fiber was continuously calcined at 1400° C. in a nitrogen atmosphere, and an amorphous silicon carbide fiber was obtained.

This amorphous silicon carbide fiber was heated for about 2 hours at 1600° C. in an argon gas atmosphere, and a heating treatment product was obtained (pretreatment step). Thereafter, this heating treatment product was heated for about 1 minute at a temperature of 2050° C. in a nitrogen gas atmosphere, and thereby a crystalline silicon carbide fiber was obtained (calcination step).

<Evaluation of Crystalline Silicon Carbide Fiber>

The crystalline silicon carbide fiber thus obtained was pulverized, and the chemical composition was analyzed using an element analyzer (LECO) and ICP-AES. As a result, the composition included Si: 68.8% by weight, C: 30.2% by weight, O: 0.04% by weight, Al: 0.23% by weight, B: 0.23% by weight, and N: 0.51% by weight. Ti was in an amount less than the detection lower limit. The density of the crystalline silicon carbide fiber was 3.09 g/cm$^3$. From this density, it was verified that the amorphous silicon carbide fiber had a dense sintered structure. Furthermore, boron nitride was produced on the surface of the crystalline silicon carbide fiber.

Figure 2:
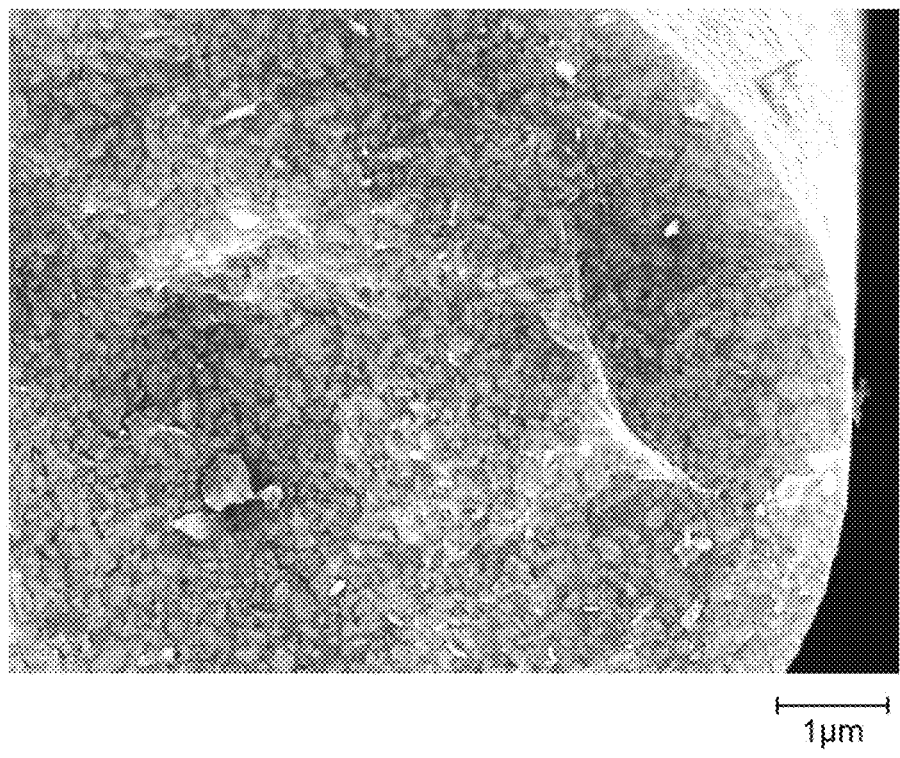
FIG. 2 is a scanning electron microscopic photograph of the crystalline silicon carbide fiber of Example 1.
Figure 3:
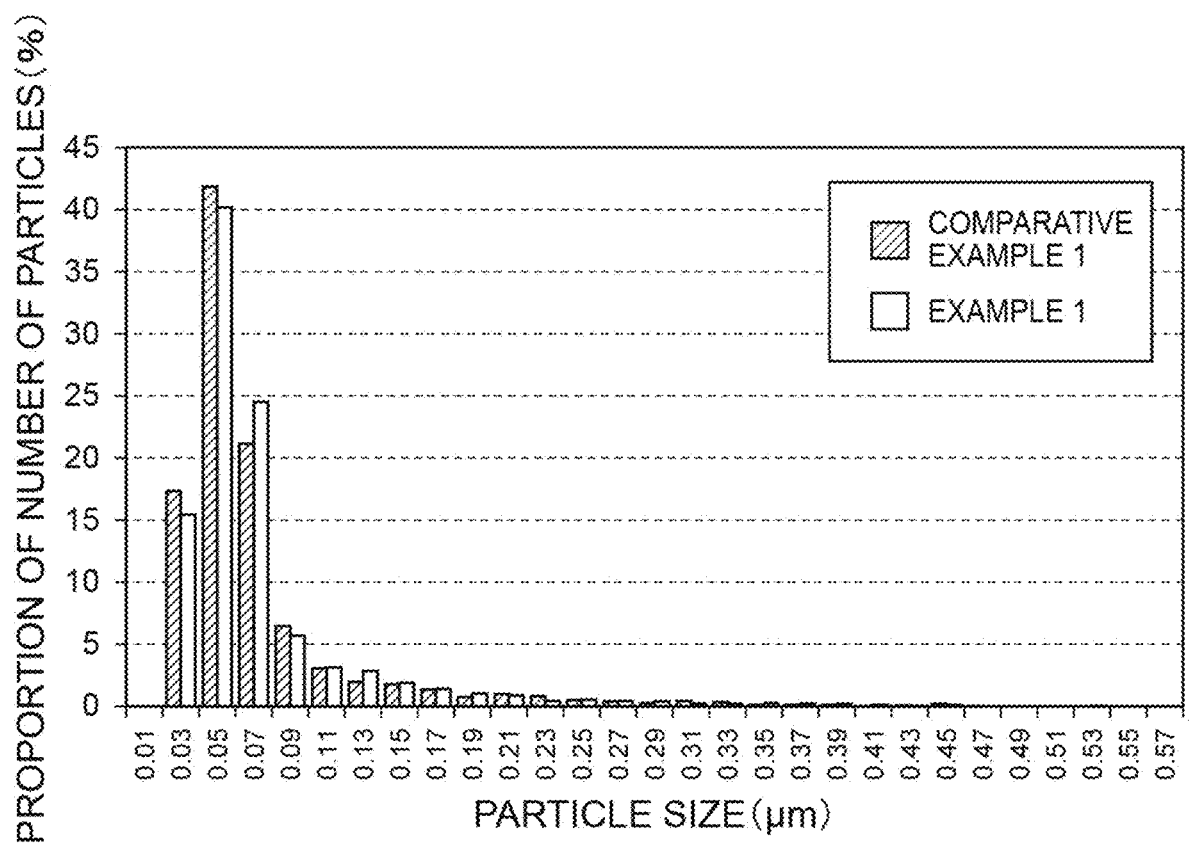
FIG. 3 shows the particle size distributions of Example 1 and Comparative Example 1.

The surface of the crystalline silicon carbide fiber was observed with a scanning electron microscope (SEM). FIG. 2 is a photograph of an image obtained by SEM observation. Furthermore, the crystallite diameter was calculated from the diffraction intensity caused by SiC crystal grains, using the crystal orientation measuring apparatus (SEM-EBSD), and a particle size distribution was determined. The results were as shown in FIG. 3.

Figure 4:
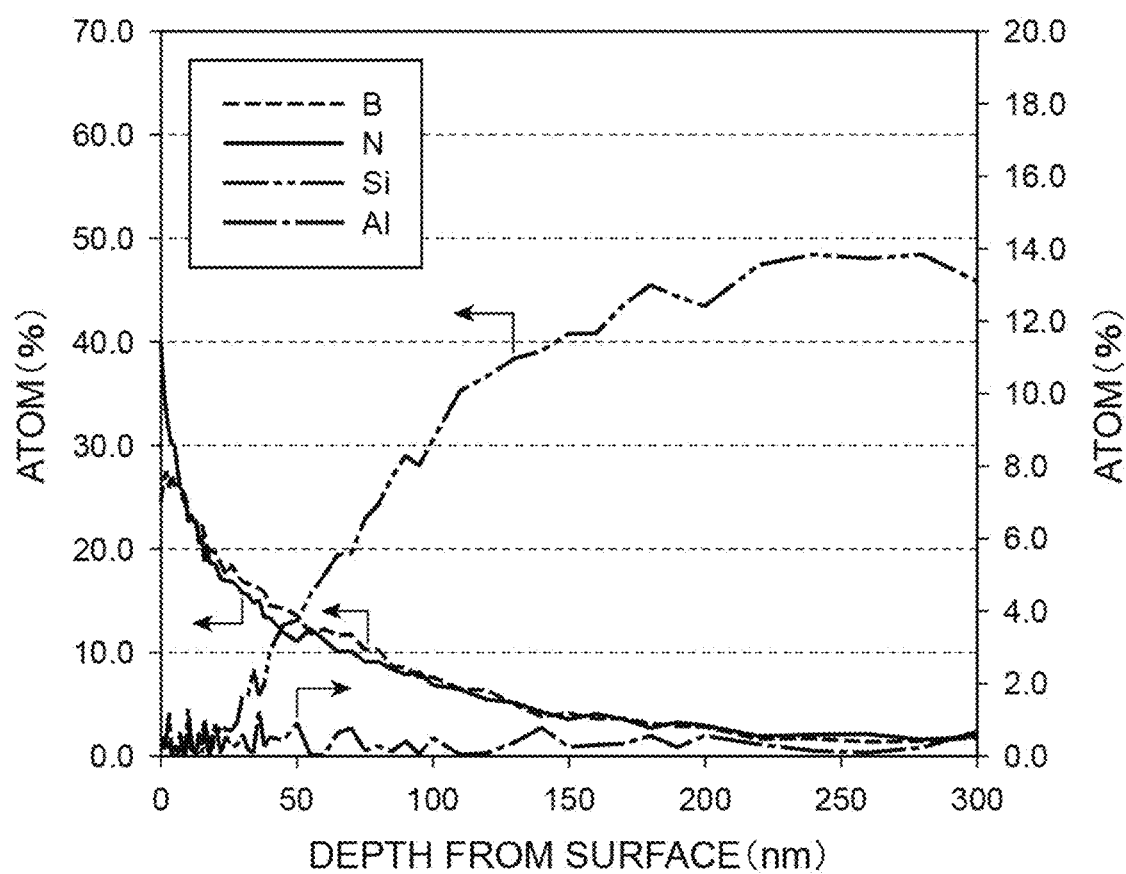
FIG. 4 is a graph showing the results of Auger electron spectroscopy analysis for the crystalline silicon carbide fiber of Example 1.
Figure 5:
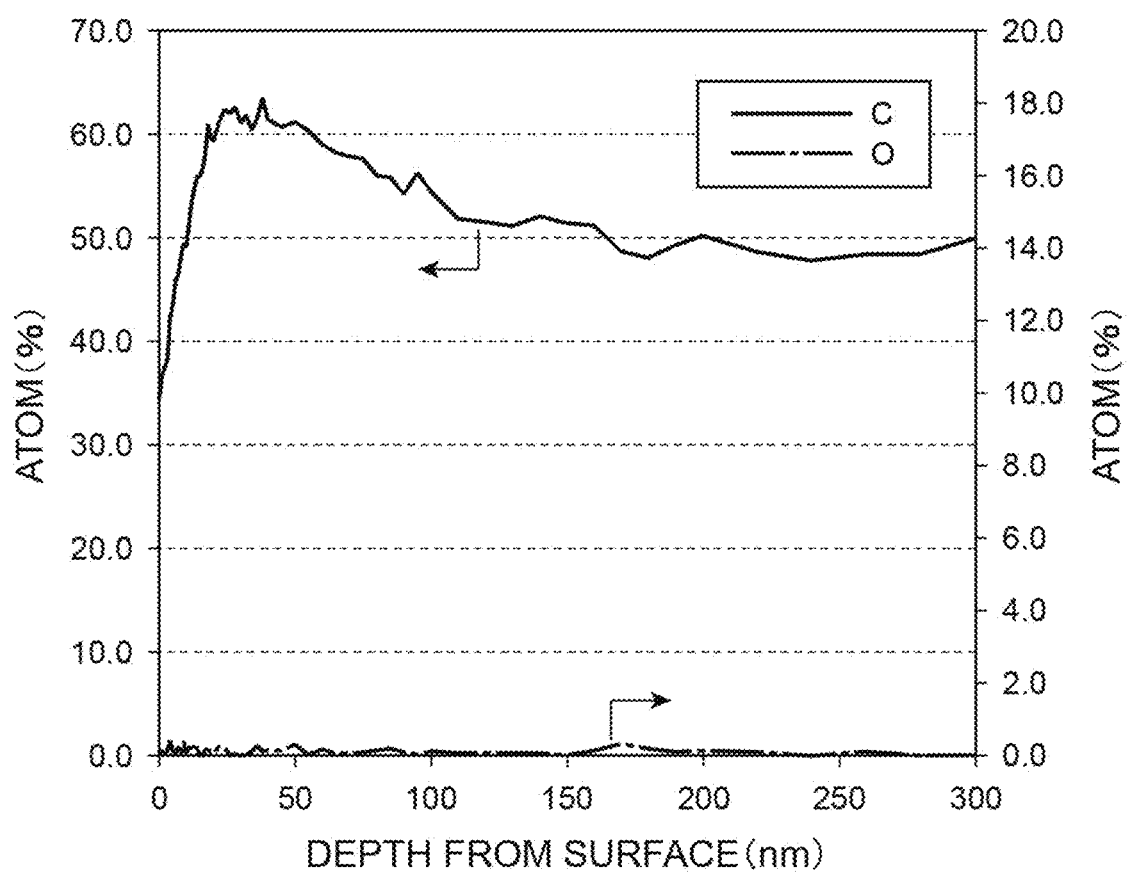
FIG. 5 is a graph showing the results of Auger electron spectroscopy analysis for the crystalline silicon carbide fiber of Example 1.

Auger electron spectroscopy analysis of the crystalline silicon carbide fiber was performed using a commercially available scanning type Auger electron spectrometer (manufactured by ULVAC-PHI, Inc., apparatus name; SMART-200). The element distribution in the depth direction of the crystalline silicon carbide fiber was investigated by alternately and repetitively performing ion etching and spectral measurement using an ion gun. The results are presented in FIG. 4 and FIG. 5. The axis of ordinate shown in FIG. 4 and FIG. 5 represents the respective atomic ratio of Si, C, O, Al, B, and N. The axis of abscissa in FIG. 4 and FIG. 5 represents the depth from the surface of the crystalline silicon carbide fiber.

As shown in FIG. 4 and FIG. 5, it was verified that at the surface portion of the crystalline silicon carbide fiber, the atomic ratios of B and N were uniformly decreasing toward the depth direction, while the atomic ratio of Si was uniformly increasing. Furthermore, since the atomic ratio of C was higher than the atomic ratio of Si in the vicinity of the surface (up to about 200 nm), the content of SiC depended on the atomic ratio of Si in this region. Therefore, the results of FIG. 4 and FIG. 5 show that at the surface portion of the crystalline silicon carbide fiber, a composition gradient layer was formed, in which the content of silicon carbide increased while the content of boron nitride decreased toward the depth direction. Furthermore, up to the depth of about 50 nm from the surface, a B-rich portion where the atomic ratio of B was higher than that of Si was formed, and over the depth of from about 50 nm to about 250 nm, a Si-rich portion where the atomic ratio of Si was higher than that of B was formed.

The measurement results of the boron concentration for each depth by Auger electron spectroscopy analysis, the four-point moving average value (AVE) of the measurement results, and the amount of change (Δ) of the four-point moving average value are presented in Table 1. The thickness immediately before the amount of change Δ became 0 or more for the first time after the amount of change Δ became a negative value consecutively at four or more points, was 260 nm. Therefore, the thickness of the composition gradient layer of Example 1 was 260 nm. The contents of Al and oxygen (O) did not undergo a large change at the surface and in the inner portion.

TABLE 1

| Depth from surface nm | Boron concentration atom (%) | AVE atom (%) | Δ atom (%) |
|---|---|---|---|
| 0 | 24.6 | — | — |
| 1 | 26.5 | — | — |
| 2 | 27.5 | — | — |
| 3 | 25.9 | 26.1 | 0.656 |
| 4 | 27.2 | 26.8 | −0.108 |
| 5 | 26.1 | 26.7 | −0.326 |
| 6 | 26.2 | 26.3 | 0.039 |
| 7 | 26.0 | 26.4 | −0.596 |
| 8 | 24.8 | 25.8 | −0.447 |
| 9 | 24.3 | 25.3 | −0.909 |
| 10 | 22.6 | 24.4 | −0.757 |
| 11 | 23.0 | 23.7 | −0.417 |
| 12 | 23.1 | 23.2 | −0.525 |
| 13 | 22.2 | 22.7 | −0.266 |
| 14 | 21.5 | 22.5 | −0.182 |
| 15 | 22.3 | 22.3 | −0.460 |
| 16 | 21.3 | 21.8 | −0.516 |
| 17 | 20.1 | 21.3 | −0.411 |
| 18 | 19.9 | 20.9 | −0.657 |
| 19 | 19.7 | 20.2 | −0.413 |
| 20 | 19.6 | 19.8 | −0.403 |
| 22 | 18.5 | 19.4 | −0.600 |
| 24 | 17.5 | 18.8 | −0.301 |
| 26 | 18.5 | 18.5 | −0.547 |
| 28 | 17.5 | 18.0 | −0.419 |
| 30 | 16.8 | 17.5 | −0.209 |
| 32 | 16.6 | 17.3 | −0.520 |
| 34 | 16.4 | 16.8 | −0.322 |
| 36 | 16.2 | 16.5 | −0.261 |
| 38 | 15.8 | 16.2 | −0.535 |
| 40 | 14.5 | 15.7 | −0.540 |
| 45 | 14.2 | 15.2 | −0.657 |
| 50 | 13.5 | 14.5 | −1.008 |
| 55 | 11.8 | 13.5 | −0.570 |
| 60 | 12.2 | 12.9 | −0.647 |
| 65 | 11.6 | 12.3 | −0.464 |
| 70 | 11.7 | 11.8 | −0.385 |
| 75 | 10.2 | 11.4 | −0.491 |
| 80 | 10.2 | 10.9 | −0.754 |
| 85 | 8.6 | 10.2 | −0.795 |
| 90 | 8.5 | 9.4 | −0.660 |
| 95 | 7.6 | 8.7 | −0.663 |
| 100 | 7.6 | 8.1 | −0.547 |
| 110 | 6.4 | 7.5 | −0.553 |
| 120 | 6.3 | 7.0 | −0.654 |
| 130 | 5.0 | 6.3 | −0.954 |
| 140 | 3.8 | 5.4 | −0.587 |
| 150 | 4.1 | 4.8 | −0.685 |
| 160 | 3.5 | 4.1 | −0.345 |
| 170 | 3.6 | 3.7 | −0.171 |
| 180 | 3.1 | 3.6 | −0.313 |
| 190 | 2.8 | 3.3 | −0.191 |
| 200 | 2.8 | 3.1 | −0.496 |
| 220 | 1.6 | 2.6 | −0.359 |
| 240 | 1.6 | 2.2 | −0.380 |
| 260 | 1.3 | 1.8 | −0.347 |
| 280 | 1.4 | 1.5 | 0.032 |
| 300 | 1.7 | 1.5 | 0.040 |
| 350 | 1.8 | 1.6 | 0.567 |
| 400 | 3.6 | 2.1 | 0.880 |
| 450 | 4.9 | 3.0 | 0.356 |
| 500 | 3.2 | 3.4 | −0.090 |
| 550 | 1.4 | 3.3 | −0.893 |
| 600 | 0.0 | 2.4 | −1.186 |
| 650 | 0.2 | 1.2 | −0.788 |
| 700 | 0.0 | 0.4 | −0.293 |
| 750 | 0.3 | 0.1 | 0.033 |
| 800 | 0.1 | 0.1 | −0.043 |
| 850 | 0.0 | 0.1 | 0.000 |
| 900 | 0.0 | 0.1 | −0.006 |
| 950 | 0.2 | 0.1 | −0.033 |
| 1000 | 0.0 | 0.1 | −0.061 |

Figure 6:
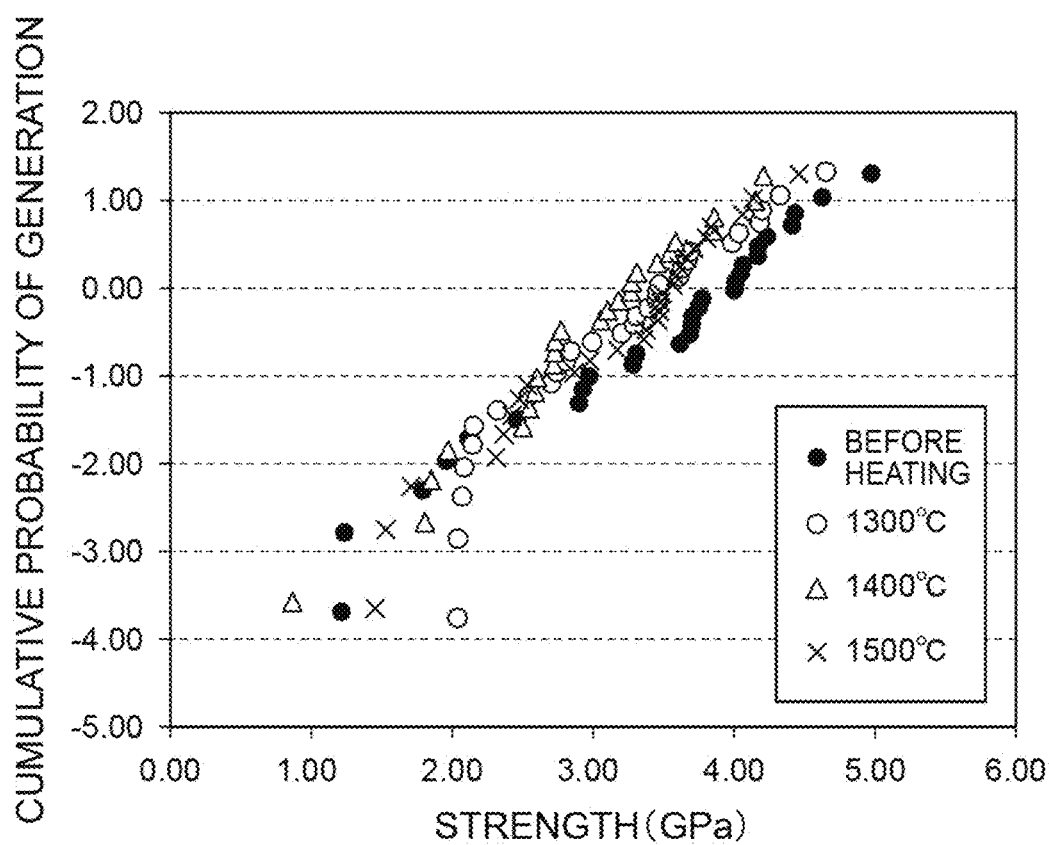
FIG. 6 is a Weibull plot for the crystalline silicon carbide fiber of Example 1.

In order to evaluate the heat resistance of the crystalline silicon carbide fiber, a tensile strength test and a creep resistance characteristics test were carried out. In the tensile strength test, the crystalline silicon carbide fiber (monofilaments) was heated for one hour at 1300° C., 1400° C., or 1500° C. in an argon gas atmosphere and then was left to cool, and thus samples for measurement were obtained. The tensile strengths of the respective samples before heating and after heating at the various temperatures were measured. The number of measurements, n, was set to 30. The Weibull distribution was determined based on the measurement results for the tensile strength of the various samples. The Weibull plot was as shown in FIG. 6. Furthermore, the average values of tensile strength before heating and after heating for one hour at 1300° ° C., 1400° C., or 1500° C. were as shown in Table 4. The ratio of the tensile strength (S1) after heating for one hour at 1500° ° C. with respect to the tensile strength (S0) before exposure is presented in Table 4 as the strength retention ratio.

Figure 7:
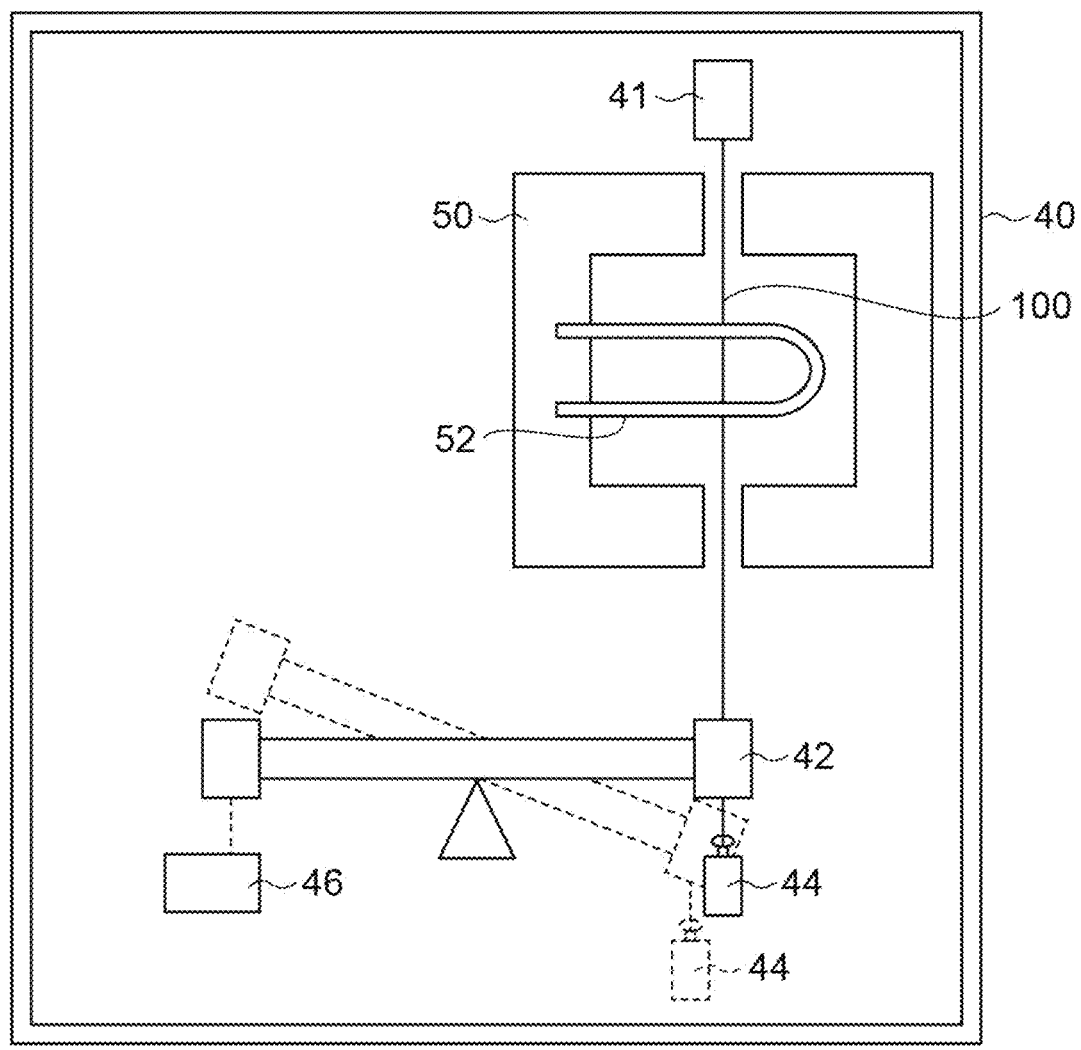
FIG. 7 is a diagram schematically illustrating a measuring apparatus used in a creep resistance test for Example 1 and Comparative Example 1.
Figure 8:
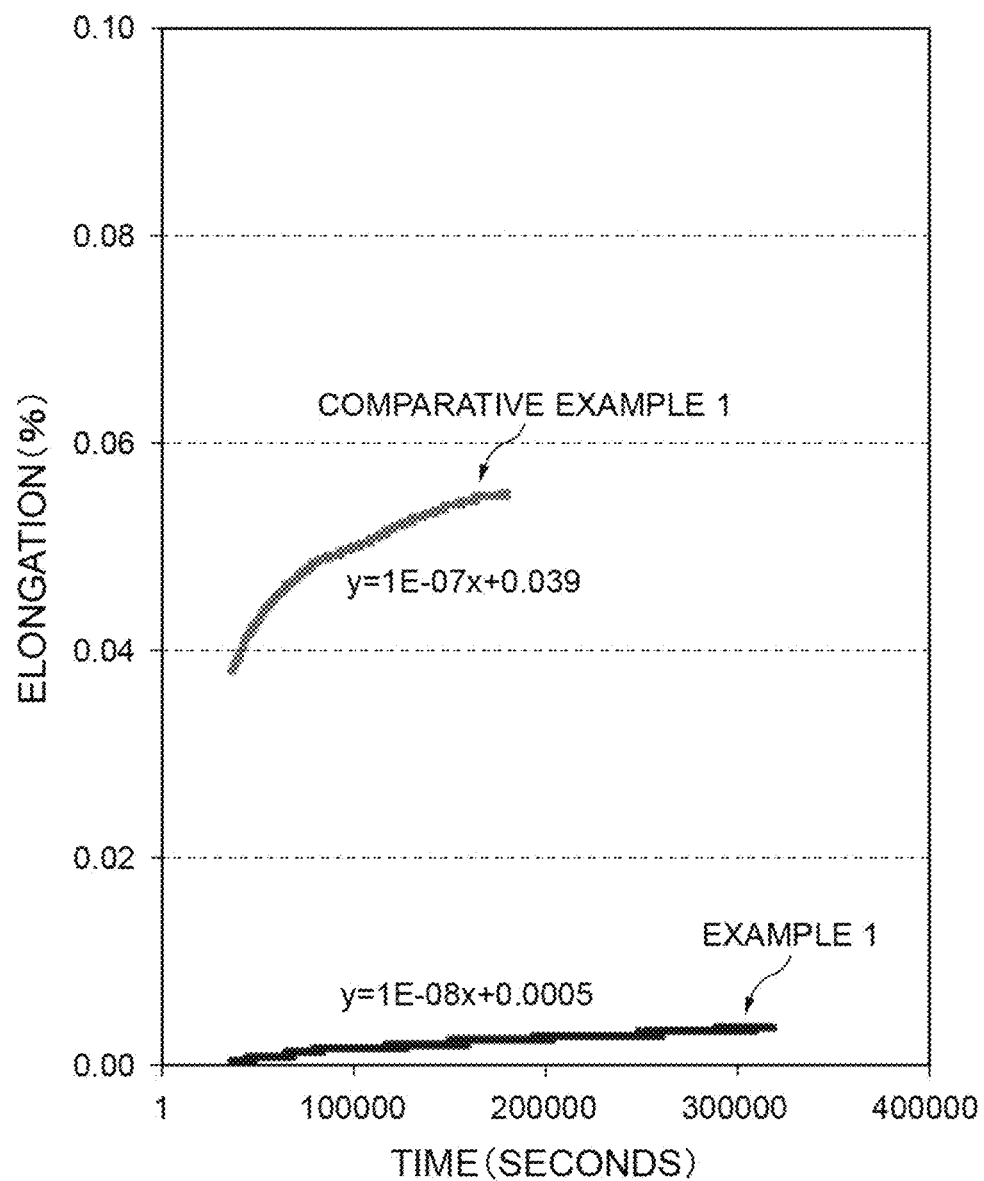
FIG. 8 is a graph showing the results of a creep resistance test for Example 1 and Comparative Example 1.

A creep resistance characteristics test according to a tensile creep method was performed using the measuring apparatus illustrated in FIG. 7. This measuring apparatus comprises, inside a chamber 40 comprising a gas inlet port and a discharge port (not illustrated in the diagram), a furnace 50 for heating a sample (crystalline silicon carbide fiber 100), a mechanism for applying a load to the sample, and a measuring unit 46 for measuring the elongation rate. While a sample (monofilament) gripped by a pair of grips 41 and 42 disposed so as to face each other vertically using such a measuring apparatus was heated to 1400° C. in an argon gas atmosphere inside the furnace 50 provided with a heater 52, the lower grip 42 was pulled by the gravity of a weight 44, and the change over time in the elongation (%) was measured. The measurement results were as shown in FIG. 8. In addition, a regression analysis of the measurement results shown in FIG. 8 was performed to determine the gradient of elongation with respect to time. The results were as shown in Table 4. Meanwhile, the expression "1E-08" in FIG. 8 and the expression "1xe-8" in Table 4 mean "1×10-8".

As another creep resistance characteristics test, measurement according to a Bend Stress Relaxation (BSR) method was performed. In the BSR method, the crystalline silicon carbide fiber was wound around a graphite rod having a diameter of 16 mm and was heated for one hour at 1500° C. in an argon gas atmosphere. After completion of heating, the shape retention ratio (m) calculated by the following Formula (2) was evaluated based on the shape after bending was restored. As the shape retention ratio (m) is closer to 1, the creep characteristics are excellent. The results were as shown in Table 4.

$$m = 1 - R0/Ra \qquad (2)$$

In Formula (2), R0 represents the curvature of the crystalline silicon carbide fiber (=curvature of rod) before heating, and Ra represents the curvature of the crystalline silicon carbide fiber after being detached from the rod after heating. The results were as shown in Table 4.

Examples 2 to 4, 6, and 7

Crystalline silicon carbide fibers were prepared in the same manner as in Example 1, except that the blending amount of either one or both of the organoboron compound and the organometallic compound (organoaluminum compound) with respect to 100 parts by weight of polydimethylsilane was changed as shown in Table 2. Then, evaluation and analysis of the crystalline silicon carbide fibers were carried out in the same manner as in Example 1. The results were as shown in Table 2 and Table 3. In addition, in Table 2, the type of the metal element constituting the organometallic compound is described on the right-hand side of the column "Organometallic compound". Furthermore, "M" in Table 3 represents the metal element in Table 2.

Example 5

A crystalline silicon carbide fiber was prepared in the same manner as in Example 1, except that the heating temperature of the calcination step was set to 2200° ° C. Then, evaluation and analysis of the crystalline silicon carbide fiber were carried out in the same manner as in Example 1. The results were as shown in Table 2, Table 3, and Table 4.

Example 8

A crystalline silicon carbide fiber was prepared in the same manner as in Example 1, except that an organoyttrium compound was used instead of the organoaluminum compound, and the blending amounts of the organoboron compound and the organoyttrium compound with respect to 100 parts by weight of polydimethylsilane were adjusted to 30 parts by weight and 12 parts by weight, respectively. As the organoyttrium compound, yttrium acetylacetonate was used. Then, evaluation and analysis of the crystalline silicon carbide fiber were carried out in the same manner as in Example 1. The results were as shown in Table 2, Table 3, and Table 4.

Examples 9 to 12

Crystalline silicon carbide fibers were prepared in the same manner as in Example 8, except that the blending amount of either one or both of the organoboron compound and the organometallic compound (organoyttrium compound) with respect to 100 parts by weight of polydimethylsilane was changed as shown in Table 2. Then, evaluation and analysis of the crystalline silicon carbide fibers were carried out in the same manner as in Example 1. The results were as shown in Table 2, Table 3, and Table 4.

Example 13

A crystalline silicon carbide fiber was prepared in the same manner as in Example 1, except that an organomagnesium compound was used instead of the organoaluminum compound, and the blending amounts of the organoboron compound and the organomagnesium compound with respect to 100 parts by weight of polydimethylsilane were adjusted to 30 parts by weight and 12 parts by weight, respectively. As the organomagnesium compound, magnesium acetylacetonate was used. Then, evaluation and analysis of the crystalline silicon carbide fiber were carried out in the same manner as in Example 1. The results were as shown in Table 2, Table 3, and Table 4.

Examples 14 to 17

Crystalline silicon carbide fibers were prepared in the same manner as in Example 13, except that the blending amount of either one or both of the organoboron compound and the organometallic compound (organomagnesium compound) with respect to 100 parts by weight of polydimethylsilane was changed as shown in Table 2. Then, evaluation and analysis of the crystalline silicon carbide fibers were carried out in the same manner as in Example 1. The results were as shown in Table 2, Table 3, and Table 4.

Example 18

A crystalline silicon carbide fiber was prepared in the same manner as in Example 1, except that an organozirconium compound was used instead of the organoaluminum compound, and the blending amounts of the organoboron compound and the organozirconium compound with respect to 100 parts by weight of polydimethylsilane were adjusted to 30 parts by weight and 12 parts by weight, respectively. As the organozirconium compound, zirconium acetylacetonate was used. Then, evaluation and analysis of the crystalline silicon carbide fiber were carried out in the same manner as in Example 1. The results were as shown in Table 2, Table 3, and Table 4.

Examples 19 to 21, 23, and 24

Crystalline silicon carbide fibers were prepared in the same manner as in Example 18, except that the blending amount of either one or both of the organoboron compound and the organometallic compound (organozirconium compound) with respect to 100 parts by weight of polydimethylsilane was changed as shown in Table 2. Then, evaluation and analysis of the crystalline silicon carbide fibers were carried out in the same manner as in Example 1. The results were as shown in Table 2, Table 3, and Table 4.

Example 22

A crystalline silicon carbide fiber was prepared in the same manner as in Example 20, except that the heating temperature of the calcination step was set to 2200° C. Then, evaluation and analysis of the crystalline silicon carbide fiber were carried out in the same manner as in Example 1. The results were as shown in Table 2, Table 3, and Table 4.

Example 25

A crystalline silicon carbide fiber was prepared in the same manner as in Example 1, except that an organoaluminum compound was not blended, and the blending amount of the organoboron compound with respect to 100 parts by weight of polydimethylsilane was adjusted to 30 parts by weight. Then, evaluation and analysis of the crystalline silicon carbide fiber were carried out in the same manner as in Example 1. The results were as shown in Table 2, Table 3, and Table 4.

Examples 26 and 27

Crystalline silicon carbide fibers were prepared in the same manner as in Example 1, except that the blending amount of the organoboron compound with respect to 100 parts by weight of polydimethylsilane was changed as shown in Table 2. Then, evaluation and analysis of the crystalline silicon carbide fibers were carried out in the same manner as in Example 1. The results were as shown in Table 2, Table 3, and Table 4.

Example 28

A crystalline silicon carbide fiber was prepared in the same manner as in Example 27, except that the heating temperature of the calcination step was set to 2200° ° C. Then, evaluation and analysis of the crystalline silicon carbide fiber were carried out in the same manner as in Example 1. The results were as shown in Table 2, Table 3, and Table 4.

Comparative Example 1

A crystalline silicon carbide fiber was prepared in the same manner as in Example 1, except that an organoboron compound was not used, and the calcination step was carried out in an argon gas atmosphere. Then, evaluation of the crystalline silicon carbide fiber was carried out in the same manner as in Example 1. The chemical composition of the crystalline silicon carbide fiber thus obtained was Si: 69.8% by weight, C: 29.8% by weight, O: 0.11% by weight, Al: 0.19% by weight, and B: 0.14% by weight. Meanwhile, N was not included. The density of the crystalline silicon carbide fiber was 3.00 g/cm³.

Figure 9:
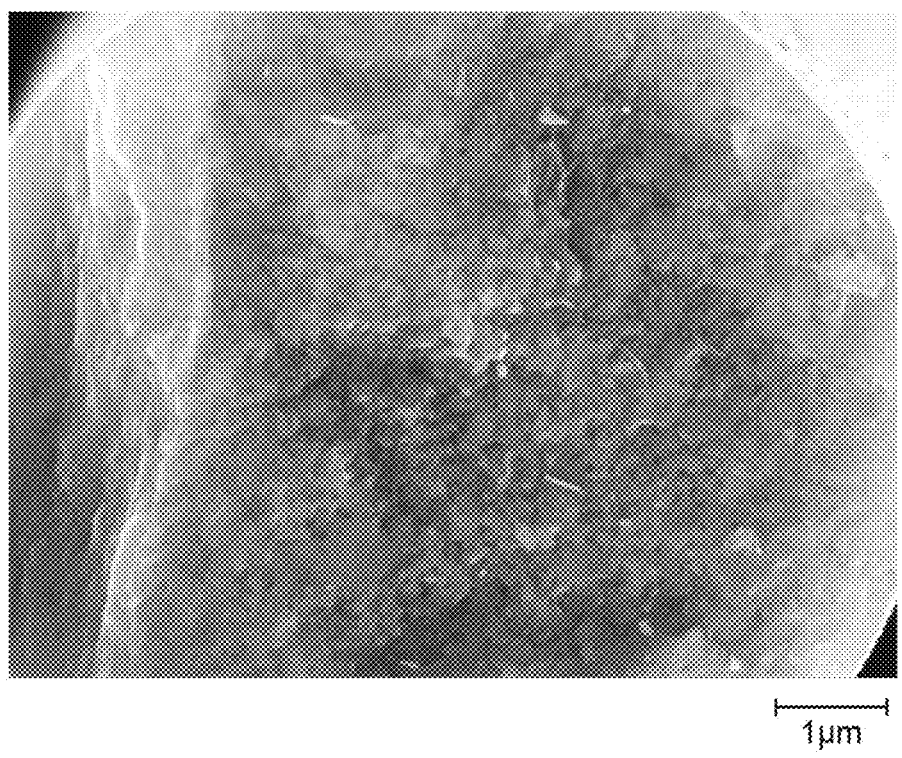
FIG. 9 is a scanning electron microscopic photograph of the crystalline silicon carbide fiber of Comparative Example 1.

Observation of the surface of the crystalline silicon carbide fiber and measurement of the particle size distribution were carried out in the same manner as in Example 1. FIG. 9 is a photograph of an image obtained by SEM observation. Furthermore, apart from this, the surface of the crystalline silicon carbide fiber was observed with a transmission electron microscope (TEM), and the particle size distribution was measured in the same manner as in Example 1. The results were as shown in FIG. 3.

Figure 10:
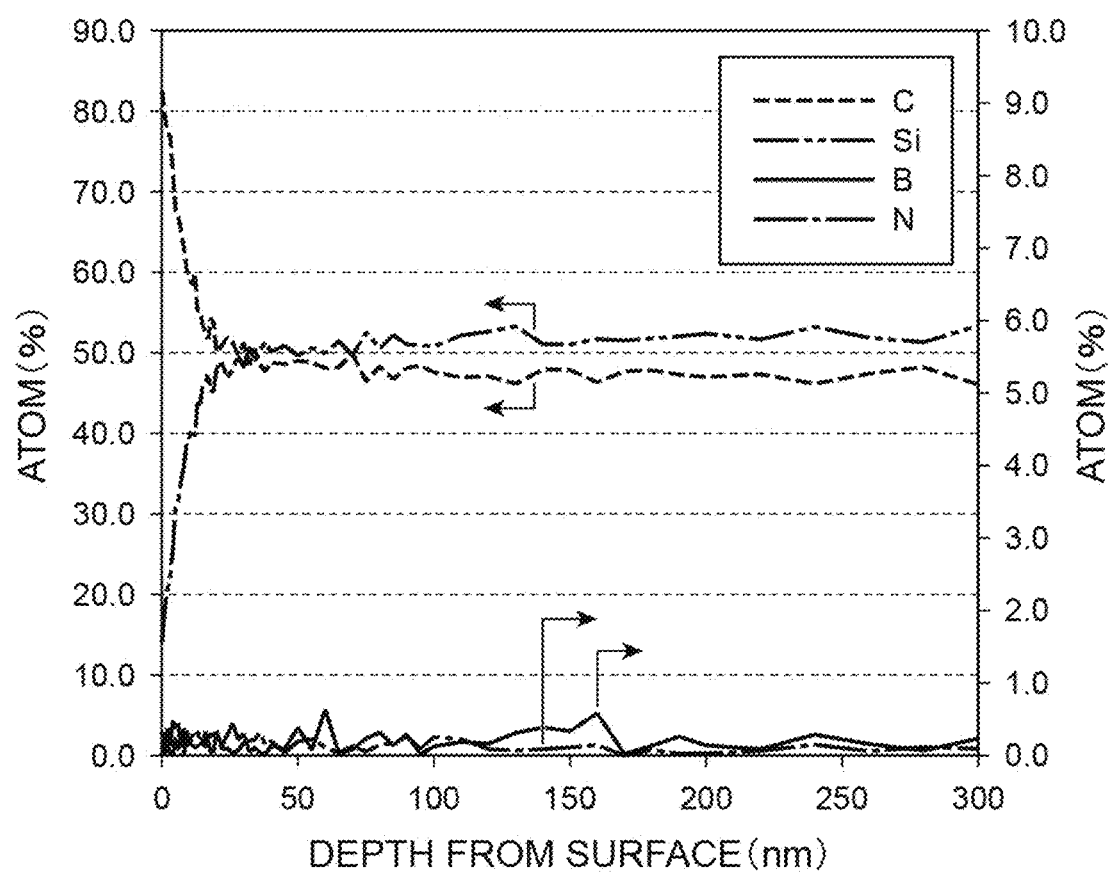
FIG. 10 is a graph showing the results of Auger electron spectroscopy analysis of the crystalline silicon carbide fiber of Comparative Example 1.
Figure 11:
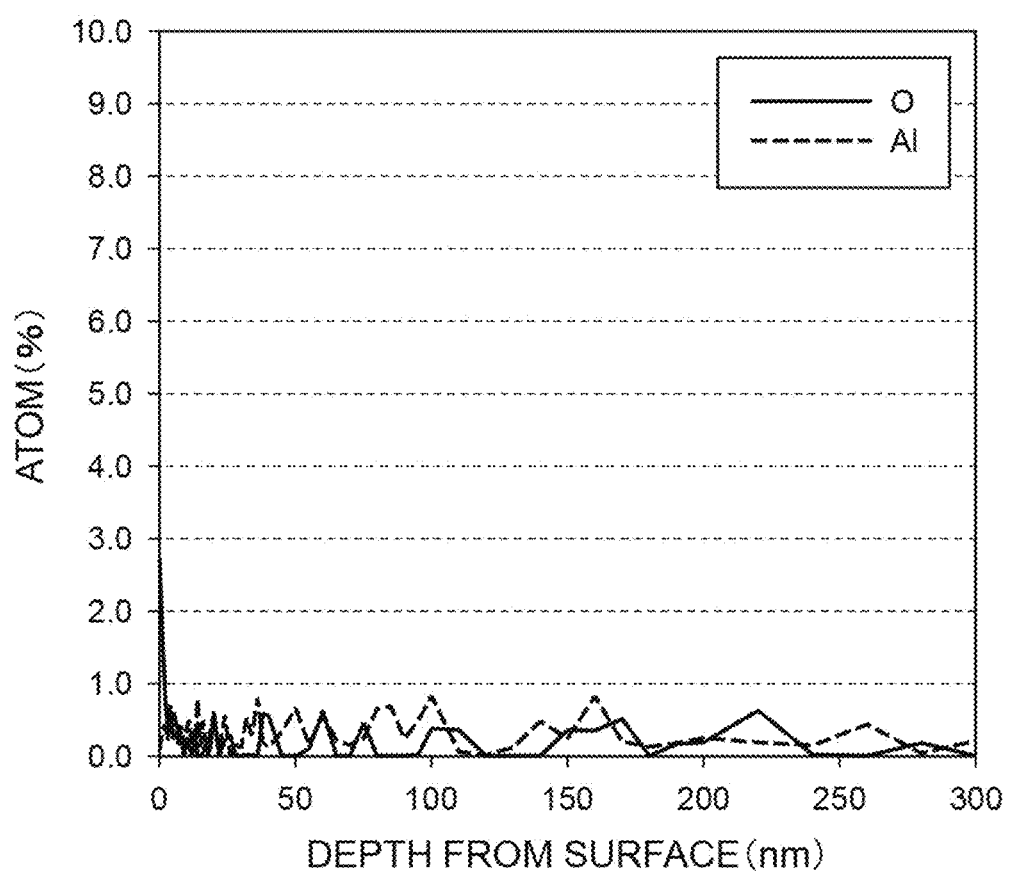
FIG. 11 is a graph showing the results of Auger electron spectroscopy analysis for the crystalline silicon carbide fiber of Comparative Example 1.

The element distribution in the depth direction of the crystalline silicon carbide fiber was investigated by Auger electron spectroscopy analysis in the same manner as in Example 1. The results are presented in FIG. 10 and FIG. 11. The axis of ordinate shown in FIG. 10 and FIG. 11 represents the respective atomic ratios of Si, Co, O, Al, B, and N. The axis of abscissa in FIG. 10 and FIG. 11 represents the depth from the surface of the crystalline silicon carbide fiber. As shown in FIG. 10, it was verified that in the vicinity of the surface of the crystalline silicon carbide fiber, there is a region in which the atomic ratio of Si increases while the atomic ratio of C decreases toward the depth direction. On the other hand, there was no correlation between the changes in the atomic ratios of B and N along the depth direction, and there was no region in which these atomic ratios uniformly changed. As such, in Comparative Example 1, a composition gradient layer in which the content of silicon carbide increased while the content of boron nitride decreased toward the depth direction was not formed. Furthermore, a B-rich portion where the atomic ratio of B was higher than that of Si was not formed.

Figure 12:
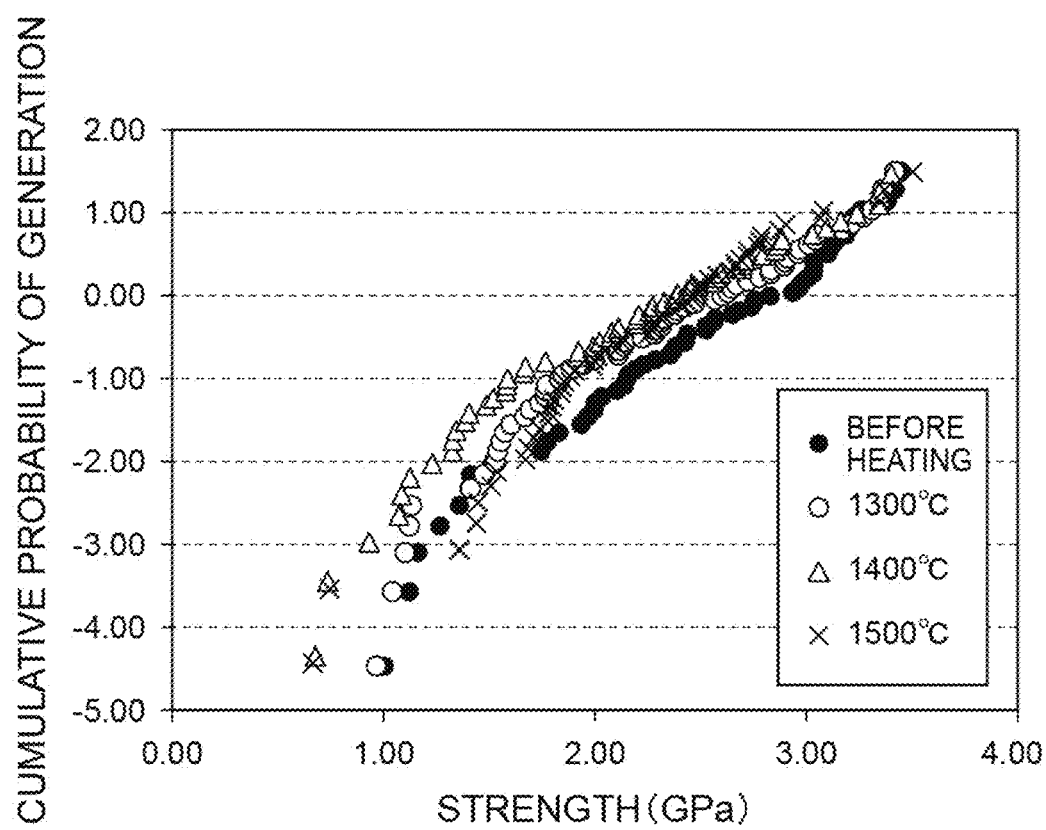
FIG. 12 is a Weibull plot for the crystalline silicon carbide fiber of Comparative Example 1.

A tensile strength test and a creep resistance test were performed in the same manner as in Example 1. FIG. 12 is a Weibull plot, and FIG. 8 shows the results for the creep resistance test measured using the measuring apparatus illustrated in FIG. 7. The results of the tensile strength test and the creep resistance test were collectively presented in Table 4.

TABLE 2

| Number | Blending proportion (parts by weight) Organo-boron compound | Blending proportion (parts by weight) Organo-metallic compound | Type of metal element | Heating temperature of second calcination step [° C.] | Density [g/cm³] |
|---|---|---|---|---|---|
| Example 1 | 12 | 12 | Al | 2050 | 3.09 |
| Example 2 | 30 | 12 | Al | 2050 | 3.15 |
| Example 3 | 60 | 12 | Al | 2050 | 3.21 |
| Example 4 | 6 | 12 | Al | 2050 | 3.07 |
| Example 5 | 12 | 12 | Al | 2200 | 3.19 |
| Example 6 | 30 | 36 | Al | 2050 | 3.13 |
| Example 7 | 30 | 6 | Al | 2050 | 3.15 |
| Example 8 | 30 | 12 | Y | 2050 | 3.15 |
| Example 9 | 60 | 12 | Y | 2050 | 3.21 |
| Example 10 | 12 | 12 | Y | 2050 | 3.09 |
| Example 11 | 30 | 36 | Y | 2050 | 3.13 |
| Example 12 | 30 | 6 | Y | 2050 | 3.15 |
| Example 13 | 30 | 12 | Mg | 2050 | 3.15 |
| Example 14 | 60 | 12 | Mg | 2050 | 3.21 |
| Example 15 | 12 | 12 | Mg | 2050 | 3.09 |
| Example 16 | 30 | 36 | Mg | 2050 | 3.13 |
| Example 17 | 30 | 6 | Mg | 2050 | 3.15 |
| Example 18 | 30 | 12 | Zr | 2050 | 3.15 |
| Example 19 | 60 | 12 | Zr | 2050 | 3.21 |
| Example 20 | 12 | 12 | Zr | 2050 | 3.09 |
| Example 21 | 6 | 12 | Zr | 2050 | 3.07 |
| Example 22 | 12 | 12 | Zr | 2200 | 3.18 |
| Example 23 | 30 | 36 | Zr | 2050 | 3.13 |
| Example 24 | 30 | 6 | Zr | 2050 | 3.15 |
| Example 25 | 30 | 0 | — | 2050 | 3.14 |
| Example 26 | 60 | 0 | — | 2050 | 3.20 |
| Example 27 | 12 | 0 | — | 2050 | 3.09 |
| Example 28 | 12 | 0 | — | 2200 | 3.09 |
| Comparative Example 1 | 0 | 12 | Al | 2050 | 3.00 |

TABLE 3

| Number | Composition of crystalline silicon carbide fiber Si [wt %] | C [wt %] | O [wt %] | M [wt %] | B [wt %] | N [wt %] | Thickness of B-rich portion [nm] | Thickness of composition gradient layer [nm] |
|---|---|---|---|---|---|---|---|---|
| Example 1 | 68.8 | 30.2 | 0.04 | 0.23 | 0.23 | 0.51 | 50 | 260 |
| Example 2 | 68.6 | 30.0 | 0.02 | 0.23 | 0.50 | 0.65 | 100 | 500 |
| Example 3 | 68.0 | 29.9 | 0.01 | 0.23 | 0.83 | 1.07 | 180 | 900 |
| Example 4 | 69.1 | 30.3 | 0.02 | 0.23 | 0.18 | 0.23 | 0 | 30 |
| Example 5 | 69.3 | 30.1 | 0.03 | 0.16 | 0.21 | 0.27 | 45 | 225 |
| Example 6 | 68.5 | 29.8 | 0.05 | 0.69 | 0.43 | 0.56 | 90 | 450 |
| Example 7 | 68.7 | 30.0 | 0.03 | 0.11 | 0.52 | 0.68 | 110 | 550 |

TABLE 3-continued

| | Composition of crystalline silicon carbide fiber | | | | | | Thickness of B-rich portion [nm] | Thickness of composition gradient layer [nm] |
|---|---|---|---|---|---|---|---|---|
| Number | Si [wt %] | C [wt %] | O [wt %] | M [wt %] | B [wt %] | N [wt %] | | |
| Example 8 | 68.4 | 29.8 | 0.04 | 0.56 | 0.50 | 0.65 | 100 | 500 |
| Example 9 | 67.7 | 29.8 | 0.05 | 0.55 | 0.83 | 1.07 | 180 | 900 |
| Example 10 | 68.6 | 30.3 | 0.02 | 0.56 | 0.23 | 0.30 | 40 | 200 |
| Example 11 | 67.0 | 30.3 | 0.01 | 1.68 | 0.43 | 0.56 | 90 | 450 |
| Example 12 | 68.5 | 30.0 | 0.03 | 0.28 | 0.52 | 0.68 | 105 | 525 |
| Example 13 | 68.8 | 29.8 | 0.05 | 0.26 | 0.50 | 0.65 | 100 | 500 |
| Example 14 | 67.7 | 30.1 | 0.02 | 0.26 | 0.83 | 1.07 | 180 | 900 |
| Example 15 | 69.0 | 30.2 | 0.02 | 0.26 | 0.23 | 0.30 | 55 | 275 |
| Example 16 | 68.3 | 29.9 | 0.04 | 0.79 | 0.43 | 0.56 | 95 | 475 |
| Example 17 | 68.3 | 30.4 | 0.01 | 0.13 | 0.52 | 0.68 | 115 | 575 |
| Example 18 | 68.2 | 30.2 | 0.02 | 0.45 | 0.50 | 0.65 | 95 | 475 |
| Example 19 | 67.8 | 29.8 | 0.05 | 0.45 | 0.83 | 1.07 | 175 | 875 |
| Example 20 | 69.0 | 30.0 | 0.03 | 0.46 | 0.23 | 0.30 | 50 | 250 |
| Example 21 | 69.2 | 29.9 | 0.04 | 0.46 | 0.17 | 0.22 | 0 | 30 |
| Example 22 | 69.1 | 30.0 | 0.03 | 0.46 | 0.20 | 0.25 | 45 | 225 |
| Example 23 | 67.4 | 30.2 | 0.02 | 1.36 | 0.43 | 0.56 | 90 | 450 |
| Example 24 | 68.3 | 30.2 | 0.02 | 0.23 | 0.52 | 0.68 | 110 | 550 |
| Example 25 | 68.8 | 30.0 | 0.04 | 0.00 | 0.55 | 0.71 | 120 | 600 |
| Example 26 | 68.0 | 30.0 | 0.04 | 0.00 | 0.89 | 1.16 | 190 | 950 |
| Example 27 | 69.3 | 30.1 | 0.03 | 0.00 | 0.25 | 0.33 | 60 | 300 |
| Example 28 | 69.3 | 30.2 | 0.02 | 0.00 | 0.22 | 0.28 | 50 | 250 |
| Comparative Example 1 | 69.8 | 29.8 | 0.11 | 0.19 | 0.14 | ND | 0 | 0 |

TABLE 4

| | Tensile strength [GPa] | | | | | Creep resistance characteristics | |
|---|---|---|---|---|---|---|---|
| | Before | After heating | | | Strength | Slope of tensile creep | Shape retention ratio |
| Number | heating | 1300° C. | 1400° C. | 1500° C. | retention ratio | method (S$^{-1}$) | of BSR method |
| Example 1 | 3.3 | 3.3 | 3.2 | 3.2 | 0.97 | 1 × e−8 | 0.6 |
| Example 2 | 3.4 | 3.2 | 2.9 | 3.2 | 0.94 | 1 × e−8 | 0.55 |
| Example 3 | 3.0 | 3.0 | 3.1 | 2.9 | 0.97 | 1 × e−8 | 0.6 |
| Example 4 | 3.3 | 3.3 | 3.3 | 3.2 | 0.97 | 1 × e−8 | 0.6 |
| Example 5 | 2.8 | 2.8 | 2.8 | 2.8 | 1.00 | 5 × e−9 | 0.8 |
| Example 6 | 3.3 | 3.2 | 3.4 | 3.1 | 0.94 | 6 × e−8 | 0.4 |
| Example 7 | 2.8 | 2.8 | 2.8 | 2.8 | 1.00 | 5 × e−8 | 0.3 |
| Example 8 | 2.8 | 2.8 | 2.6 | 2.7 | 0.96 | 4 × e−8 | 0.4 |
| Example 9 | 2.6 | 2.7 | 2.8 | 2.6 | 1.00 | 3 × e−8 | 0.4 |
| Example 10 | 2.8 | 2.8 | 2.5 | 2.8 | 1.00 | 4 × e−8 | 0.4 |
| Example 11 | 2.9 | 2.9 | 2.8 | 2.7 | 0.93 | 8 × e−8 | 0.3 |
| Example 12 | 2.4 | 2.4 | 2.5 | 2.3 | 0.96 | 6 × e−8 | 0.4 |
| Example 13 | 2.5 | 2.4 | 2.6 | 2.4 | 0.96 | 5 × e−8 | 0.4 |
| Example 14 | 2.5 | 2.4 | 2.3 | 2.4 | 0.96 | 5 × e−8 | 0.4 |
| Example 15 | 2.4 | 2.2 | 2.1 | 2.1 | 0.88 | 8 × e−8 | 0.3 |
| Example 16 | 2.4 | 2.7 | 2.4 | 2.3 | 0.96 | 6 × e−8 | 0.4 |
| Example 17 | 2.5 | 2.5 | 2.3 | 2.1 | 0.84 | 9 × e−8 | 0.3 |
| Example 18 | 3.4 | 3.4 | 3.2 | 3.2 | 0.94 | 2 × e−8 | 0.5 |
| Example 19 | 3.3 | 3.0 | 3.1 | 3.1 | 0.94 | 1 × e−8 | 0.6 |
| Example 20 | 3.2 | 3.4 | 3.0 | 3.0 | 0.94 | 4 × e−8 | 0.4 |
| Example 21 | 3.3 | 3.2 | 3.2 | 3.1 | 0.94 | 4 × e−8 | 0.4 |
| Example 22 | 2.9 | 3.0 | 2.9 | 2.9 | 0.97 | 5 × e−9 | 0.8 |
| Example 23 | 3.4 | 3.4 | 3.4 | 3.4 | 1.00 | 1 × e−8 | 0.6 |
| Example 24 | 3.3 | 3.3 | 3.2 | 3.1 | 0.94 | 5 × e−8 | 0.3 |
| Example 25 | 3.3 | 3.2 | 3.3 | 3.1 | 0.94 | 9 × e−9 | 0.3 |
| Example 26 | 3.3 | 3.3 | 3.1 | 3.2 | 0.97 | 9 × e−9 | 0.3 |
| Example 27 | 3.3 | 3.2 | 3.0 | 3.0 | 0.91 | 7 × e−9 | 0.3 |
| Example 28 | 2.8 | 2.7 | 2.8 | 2.8 | 1.00 | 2 × e−9 | 0.3 |
| Comparative Example 1 | 2.4 | 2.3 | 2.1 | 2.1 | 0.88 | 1 × e−7 | 0.3 |

The compositions of the various Examples and the Comparative Example were as shown in Table 3. In all of the Examples, the content of Ti was less than the detection lower limit. As shown in Table 4, Example 1 had higher tensile strength than Comparative Example 1 in both the cases of before heating and after heating. Furthermore, all the Examples exhibited excellent creep resistance characteristics compared to Comparative Example 1. In the Weibull plots shown in FIG. 6 and FIG. 12, it is shown that Example 1 of FIG. 6 has larger tensile strength than Comparative Example 1 of FIG. 12. Even in the results for the creep resistance test according to a tensile creep method of FIG. 8, it is shown Example 1 has excellent tensile creep characteristics (creep resistance characteristics).

INDUSTRIAL APPLICABILITY

A crystalline silicon carbide fiber having excellent tensile creep characteristics at high temperatures while maintaining high tensile strength, and a method for manufacturing the same are provided. Furthermore, a ceramic composite substrate including the above-described crystalline silicon carbide fiber is provided.

REFERENCE SIGNS LIST

10: main body portion, 20: composition gradient layer, 21: Si-rich portion, 22: B-rich portion, 40: chamber, 41, 42: grip, 44: weight, 46: measuring unit, 50: furnace, 52: heater, 100: crystalline silicon carbide fiber, 100a: surface.

The invention claimed is:

1. A crystalline silicon carbide fiber comprising:
   silicon carbide; and
   boron nitride;
   the crystalline silicon carbide fiber having a content of Si of 64% to 72% by weight, a content of C of 28% to 35% by weight, a content of B of 0.1% to 3.0% by weight, and a content of Ti of less than 0.1% by weight, and
   the crystalline silicon carbide fiber including, at a surface portion, a composition gradient layer in which a content of silicon carbide increases while a content of boron nitride decreases toward a depth direction.

2. The crystalline silicon carbide fiber according to claim 1,
   wherein the crystalline silicon carbide fiber includes a main body portion containing silicon carbide as a main component on a side closer to the center than the composition gradient layer, and
   the composition gradient layer includes a B-rich portion having a higher atomic ratio of B than that of Si on a surface side; and a Si-rich portion having a higher atomic ratio of Si than that of B on a side closer to a main body portion side than the B-rich portion.

3. The crystalline silicon carbide fiber according to claim 2, wherein the B-rich portion has a thickness of 30 nm or more.

4. The crystalline silicon carbide fiber according to claim 2, wherein the atomic ratio of B in the B-rich portion is 5 atom % or more.

5. The crystalline silicon carbide fiber according to claim 1, wherein the composition gradient layer has a thickness of 30 nm or more.

6. The crystalline silicon carbide fiber according to claim 1,
   the crystalline silicon carbide fiber including at least one element selected from the group consisting of Al, Y, Zr, and Mg,
   wherein in the case of including Al, a content thereof is 3.8% by weight or less,
   in the case of including Y, a content thereof is 3.8% by weight or less,
   in the case of including Zr, a content thereof is 3.8% by weight, and
   in the case of including Mg, a content thereof is 3.8% by weight or less.

7. A method for manufacturing a crystalline silicon carbide fiber, the method comprising:
   a calcination step of heating an amorphous silicon carbide fiber containing boron to 1550° ° C. to 2200° C. in an inert atmosphere including nitrogen and thereby forming, at a surface portion, a composition gradient layer in which a content of silicon carbide increases while a content of boron nitride decreases toward a depth direction;
   wherein the content of Si is 64% to 72% by weight, the content of C is 28% to 35% by weight, the content of B is 0.1% to 3.0% by weight, and a content of Ti is less than 0.1% by weight.

8. The method for manufacturing a crystalline silicon carbide fiber according to claim 7, the method comprising:
   a pretreatment step of heating, before the calcination step, the amorphous silicon carbide fiber containing boron at 1550° ° C. to 1850° C. in an inert atmosphere different from nitrogen and obtaining a heating treatment product,
   wherein in the calcination step, the heating treatment product is heated at a temperature higher than that of the pretreatment step, in an inert atmosphere including nitrogen.

9. The method for manufacturing a crystalline silicon carbide fiber according to claim 8, wherein in the calcination step, the heating treatment product is heated to 1900° ° C. to 2200° ° C.

10. The method for manufacturing a crystalline silicon carbide fiber according to claim 7, the method comprising:
    a spinning step of melt-spinning a thermoplastic polymer composition including an organosilicon polymer and an organoboron compound to obtain a fiber;
    an infusibilization step of heating the fiber in an atmosphere including oxygen; and
    a heating step of heating a infusibilized fiber at a temperature in the range of 800° ° C. to 1500° C. in an inert gas and thereby obtaining the amorphous silicon carbide fiber.

11. A ceramic composite substrate comprising:
    a ceramic material; and
    the crystalline silicon carbide fiber according to claim 1.

12. The crystalline silicon carbide fiber according to claim 3, wherein the atomic ratio of B in the B-rich portion is 5 atom % or more.

13. The crystalline silicon carbide fiber according to claim 2, wherein the composition gradient layer has a thickness of 30 nm or more.

14. The crystalline silicon carbide fiber according to claim 3, wherein the composition gradient layer has a thickness of 30 nm or more.

15. The crystalline silicon carbide fiber according to claim 4, wherein the composition gradient layer has a thickness of 30 nm or more.

16. The crystalline silicon carbide fiber according to claim 2,
the crystalline silicon carbide fiber including at least one element selected from the group consisting of Al, Y, Zr, and Mg,
wherein in the case of including Al, a content thereof is 3.8% by weight or less,
in the case of including Y, a content thereof is 3.8% by weight or less,
in the case of including Zr, a content thereof is 3.8% by weight, and
in the case of including Mg, a content thereof is 3.8% by weight or less.

17. The crystalline silicon carbide fiber according to claim 3,
the crystalline silicon carbide fiber including at least one element selected from the group consisting of Al, Y, Zr, and Mg,
wherein in the case of including Al, a content thereof is 3.8% by weight or less,
in the case of including Y, a content thereof is 3.8% by weight or less,
in the case of including Zr, a content thereof is 3.8% by weight, and
in the case of including Mg, a content thereof is 3.8% by weight or less.

18. The crystalline silicon carbide fiber according to claim 4,
the crystalline silicon carbide fiber including at least one element selected from the group consisting of Al, Y, Zr, and Mg,
wherein in the case of including Al, a content thereof is 3.8% by weight or less,
in the case of including Y, a content thereof is 3.8% by weight or less,
in the case of including Zr, a content thereof is 3.8% by weight, and
in the case of including Mg, a content thereof is 3.8% by weight or less.

19. The crystalline silicon carbide fiber according to claim 5,
the crystalline silicon carbide fiber including at least one element selected from the group consisting of Al, Y, Zr, and Mg,
wherein in the case of including Al, a content thereof is 3.8% by weight or less,
in the case of including Y, a content thereof is 3.8% by weight or less,
in the case of including Zr, a content thereof is 3.8% by weight, and
in the case of including Mg, a content thereof is 3.8% by weight or less.

20. The method for manufacturing a crystalline silicon carbide fiber according to claim 8, the method comprising:
a spinning step of melt-spinning a thermoplastic polymer composition including an organosilicon polymer and an organoboron compound to obtain a fiber;
an infusibilization step of heating the fiber in an atmosphere including oxygen; and
a heating step of heating a infusibilized fiber at a temperature in the range of 800° ° C. to 1500° C. in an inert gas and thereby obtaining the amorphous silicon carbide fiber.

21. The method for manufacturing a crystalline silicon carbide fiber according to claim 9, the method comprising:
a spinning step of melt-spinning a thermoplastic polymer composition including an organosilicon polymer and an organoboron compound to obtain a fiber;
an infusibilization step of heating the fiber in an atmosphere including oxygen; and
a heating step of heating an infusibilized fiber at a temperature in the range of 800° ° C. to 1500° ° C. in an inert gas and thereby obtaining the amorphous silicon carbide fiber.

22. A ceramic composite substrate comprising:
a ceramic material; and
the crystalline silicon carbide fiber according to claim 6.

* * * * *